US007181445B2

(12) United States Patent
Bebo et al.

(10) Patent No.: US 7,181,445 B2
(45) Date of Patent: Feb. 20, 2007

(54) AGGREGATING, RETRIEVING, AND PROVIDING ACCESS TO DOCUMENT VISUALS

(75) Inventors: Michael Bebo, Troy, OH (US); Merle Carr, Kettering, OH (US); Melissa Schneider, Dayton, OH (US); Linda Domi, Kettering, OH (US); Rebecca Sroufe, Germantown, OH (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 563 days.

(21) Appl. No.: 10/656,521

(22) Filed: Sep. 5, 2003

(65) Prior Publication Data

US 2005/0055337 A1 Mar. 10, 2005

(51) Int. Cl.
*G06F 7/00* (2006.01)
*G06F 17/30* (2006.01)
(52) U.S. Cl. .................. 707/3; 707/102; 707/104.1
(58) Field of Classification Search ............... None
See application file for complete search history.

(56) References Cited

U.S. PATENT DOCUMENTS

| | | | | |
|---|---|---|---|---|
| 5,826,261 A | * | 10/1998 | Spencer ......................... 707/5 |
| 5,983,262 A | * | 11/1999 | Kukkal ........................ 709/204 |
| 6,006,225 A | * | 12/1999 | Bowman et al. ............... 707/5 |
| 6,064,980 A | * | 5/2000 | Jacobi et al. ................ 705/26 |
| 6,182,073 B1 | * | 1/2001 | Kukkal ........................ 707/10 |
| 6,430,575 B1 | * | 8/2002 | Dourish et al. ............. 707/200 |
| 6,519,571 B1 | * | 2/2003 | Guheen et al. ............... 705/14 |
| 6,681,371 B1 | * | 1/2004 | Devanbu .................... 715/515 |
| 6,721,713 B1 | * | 4/2004 | Guheen et al. ................ 705/1 |
| 6,745,211 B2 | * | 6/2004 | Kabasakalian et al. ..... 707/204 |
| 6,766,321 B2 | * | 7/2004 | Sasaki et al. .................. 707/8 |
| 7,031,967 B2 | * | 4/2006 | Cheng et al. ................ 707/10 |

* cited by examiner

*Primary Examiner*—Tim Vo
*Assistant Examiner*—Jay Allen Morrison
(74) *Attorney, Agent, or Firm*—Merchant&Gould

(57) ABSTRACT

A software module referred to as a content manager is provided for loading and maintaining a variety of data and associated metadata in a computer database. The data may be loaded in the form of individual documents that support business preparation or sales presentations where only one copy of each document is stored in the database. The metadata may be loaded in the form of attributes of the documents. A table of users may also be loaded in the database including a geographic or business division for each user. A role is assigned to the user, thereby granting access privileges to certain views of the database. An online user interface software module is also provided for remote access to the documents. Searches may be conducted by a variety of attributes. Documents may be associated into visual presentations or multiple presentations merged into one presentation. Three types of presentations private, shared, and global are supported. The user may also print, view, or download, email, post to website, or fax the documents and presentations.

28 Claims, 27 Drawing Sheets

|   | A | B | C | D | E | F |
|---|---|---|---|---|---|---|
|   | Username | Package Name | Created | Updated | Expire | Type |
| 324 | jpellitt | Coupons-Nicole**112200225254 | 11/22/2002 |  | 11/22/2002 | S |
| 325 | jrichard | Hobbs**1222200210155B | 12/2/2002 | 12/2/2002 10:42 |  |  |
| 326 | jschatte | Merge**11112002133759 | 11/11/2002 |  |  |  |
| 327 | jschatte | E-Print**111120002123606 | 11/11/2002 | 11/11/2002 12:46 |  |  |
| 328 | jschatte | internet**111120021210 | 11/11/2002 |  |  |  |
| 329 | jschatte | In-Column**11112002124624 | 11/11/2002 | 11/11/2002 12:47 |  |  |
| 330 | jschatte | In-Column**11112002124725 | 11/11/2002 |  |  |  |
| 331 | jschatte | Thisisasbigas**111120021247 | 11/11/2002 |  |  |  |
| 332 | jschatte | NewPresentation**1111200212848 | 11/11/2002 | 11/11/2002 13:30 |  |  |
| 333 | jschatte | ApplianceDealers**1111200214024 | 11/11/2002 |  |  |  |
| 334 | jshannon | jen**124200211 0519 | 12/4/2002 |  |  |  |
| 335 | kchandle | Travel**1118200211 2105 | 11/18/2002 | 11/19/2002 8:57 |  |  |
| 336 | mfeldber | mailing**16200375004 | 1/6/2003 |  |  |  |
| 337 | mfeldber | asginfo**124200255654 | 12/4/2002 |  |  |  |
| 338 | mfeldber | anchinfo**124200255620 | 12/4/2002 |  |  |  |
| 339 | mfeldber | Insurance**124200253155 | 12/4/2002 |  |  |  |
| 340 | mfeldber | AttorneyLawyers**129200215537 | 12/9/2002 |  |  |  |
| 341 | mmanager | Banks**117200211447 | 11/7/2002 | 11/7/2002 14:22 |  | G |
| 342 | mmanager | Pizza**115200221719 | 11/5/2002 | 11/5/2002 14:19 |  | G |
| 343 | mmanager | Hotels**117200215905 | 11/7/2002 | 11/7/2002 14:00 |  | G |
| 344 | mmanager | Lumber**117200220253 | 11/7/2002 | 11/7/2002 14:04 |  | G |
| 345 | mmanager | Motels**118200225540 | 11/8/2002 | 11/8/2002 14:57 |  | G |

| Directory No | Internet Directory No | Directory Name | State | Date Created |
|---|---|---|---|---|
| 017024 | 102353 | Aberdeen | ID | 8/1/2002 |
| 049010 | 102354 | Adams Pulaski | NY | 8/1/2002 |
| 068010 | 102811 | Adamsville | TN | 8/1/2002 |
| 049028 | 102355 | Adirondack | NY | 8/1/2002 |
| 102046 | (null) | Alaska Shoppers Guide | AK | 8/1/2002 |
| 049557 | (null) | Albany | NY | 8/1/2002 |
| 049064 | (null) | Albion | NY | 8/1/2002 |
| 102000 | (null) | Alden-Kiester | MN | 8/1/2002 |
| 018053 | 102134 | Aledo-Hillsdale-Morrison | IL | 8/1/2002 |
| 049082 | 102356 | Alfred | NY | 8/1/2002 |
| 076218 | (null) | Alleghany Cty | VA | 10/25/2002 |
| 044422 | 102057 | Alma Kearney | NE | 8/1/2002 |
| 018187 | 102137 | Altamont | IL | 8/1/2002 |
| 005035 | 102357 | Alturas-Intermountain North | CA | 8/1/2002 |
| 049137 | (null) | Amsterdam | NY | 8/1/2002 |
| 002030 | 101753 | Anchorage | AK | 8/1/2002 |
| 101476 | (null) | Anchorage Mobile Mini | AK | 8/1/2002 |
| 103165 | 103441 | Andalusia-Opp Area | AL | 10/29/2002 |
| 069132 | 103460 | Andrews | TX | 8/1/2002 |
| 000555 | (null) | Ap/Volt Dummy Directory | ND | 10/25/2002 |

AGGREGATING, RETRIEVING, AND PROVIDING ACCESS TO DOCUMENT VISUALS

COPYRIGHT NOTICE

A portion of the disclosure of this patent document contains material that is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention relates to a method and system for aggregating, retrieving, and delivering a variety of data for individual display or association into visual presentations.

BACKGROUND OF THE INVENTION

The industrial age has evolved into the age of information. The ability to produce information quickly and efficiently in an easily understood format gives businesses a significant competitive advantage in servicing clients and making decisions. The use of databases has become essential as a means of providing information for businesses and their respective clients or customers. Unfortunately, as the quantity of data stored in the database increases so does the time and resources needed to retrieve meaningful results from queries. The phone directory advertising business is no exception. Documents utilized in supporting the sale of advertising space in directories are gathered and organized for retrieval. These documents include demographic studies, rate sheets for the cost of ads, directory distribution maps and other varied documents that may be used in preparation for sales calls or presentations. Previous database/data management systems for processing these documents handle voluminous quantities of data with limited methods of gathering and organizing the data such that retrieval for research or client inquiry purposes is efficient. For instance, as the quantity of supporting documents increases so does the quantity of time and resources consumed in maintaining and locating individual or a group of documents relevant to queries. This, in part, is due to flat database structures requiring the storage of multiple copies of a document visual and the unnecessary searching of an entire database. Additionally, personnel are less likely to utilize the database for information retrieval capabilities due to the lack of efficiency and reliable results in response to queries. This diminishes the competitive advantage a directory advertising business or any business may have due to information retrieval capabilities.

Accordingly, there is a need for a method and system for aggregating, retrieving, and delivering a variety of data that allows for efficient and user-friendly retrieval of results in response to desired queries. It is with respect to these and other considerations that the present invention has been made.

SUMMARY OF THE INVENTION

Embodiments of the present invention provide methods and systems for aggregating, retrieving, and delivering data. A software module referred to as a content manager is provided for loading and maintaining a variety of data and associated metadata in a computer database. The data may be loaded in the form of individual document visuals where only one copy of each document is stored in the database. The metadata may be loaded in the form of attributes of the document visuals such as the geographic or business divisions that are related and assigned to the document visual. A table of users may also be loaded in the database in the form of user profiles with each profile including a primary geographic or business division for each user. Based on the primary geographic or business division assigned to the user, the content manager may assign a database role to the user, thereby granting access privileges to certain views of the database.

Once the data and metadata are loaded into the database, an Internet or Intranet-based software module is provided to respond to requests by authorized users for remote access to the database over a distributed network. In response to a request for access to the database, the Internet-based software module launches or renders a series of web pages in the form of an online user interface displaying at least one view of the database. Views of the database may differ between users based on the database role assigned to the user. Access to the data is granted based on assigned database roles and user profiles. By utilizing roles, views, and profiles the Internet-based software module can effectively deliver just the content or documents needed for the geographic or business division of the user. For instance, a user who is assigned to a division may select an online user interface function, representing a desired query, via the online user interface and the software module will then search only the documents or document visuals that have the division of the user assigned as an attribute. This enables a user to locate and retrieve document visuals without searching the entire database and thereby searching documents not pertinent to the geographic or business division of the user.

In accordance with other aspects of the present invention, once the document visuals are retrieved, they are displayed via the online user interface and the user may view the documents individually, associate the document visuals into visual presentations, or concatenate the document visuals for printed presentations, The user may also download the document visuals or presentations to a remote personal computer, laptop, or device. The document visuals and presentations may also be transmitted by electronic mail or facsimile to other locations. Furthermore, presentations may be posted to a website and then retrieved or opened by a customer or client through a link or pass-code. Users of the online interface may also utilize the merge capabilities of the software module to associate two or more presentations into one presentation, eliminating the association of duplicate document metadata between the presentations. The methods and systems support three types of presentations: private, shared, and global.

In accordance with other aspects of the present invention all queries via the content manager or the user interface that lead to the retrieval of a document visual, point to the one copy of that document visual stored in the database. Searches may be conducted by categories, keyword(s), and/or by a function to retrieve the document visuals added to the database in the last X days, where X is a variable number of days. Furthermore, customer or client telephone numbers or identification numbers may be entered to retrieve customer account histories from a remote data warehouse.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 11 is a computer screen display showing a presentation report spreadsheet generated via an administrative interface according to an embodiment of the present invention.

FIGS. 13A–13B are a computer screen displays showing an online user interface displaying a view of a super-category function utilized in the search and retrieval of data and an attribute table supporting the online user interface functionality according to an embodiment of the present invention.

FIGS. 14A–14B are computer screen displays showing an online user interface displaying views of a super-category function and a retrieved document visual utilized in the search and retrieval of data according to an embodiment of the present invention.

DETAILED DESCRIPTION

As described briefly above, embodiments of the present invention are directed to methods and systems for aggregating, retrieving, and delivering data. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is, therefore, not to be taken in a limiting sense and a scope of the present invention is defined by the appended claims and their equivalents.

Figure 1:
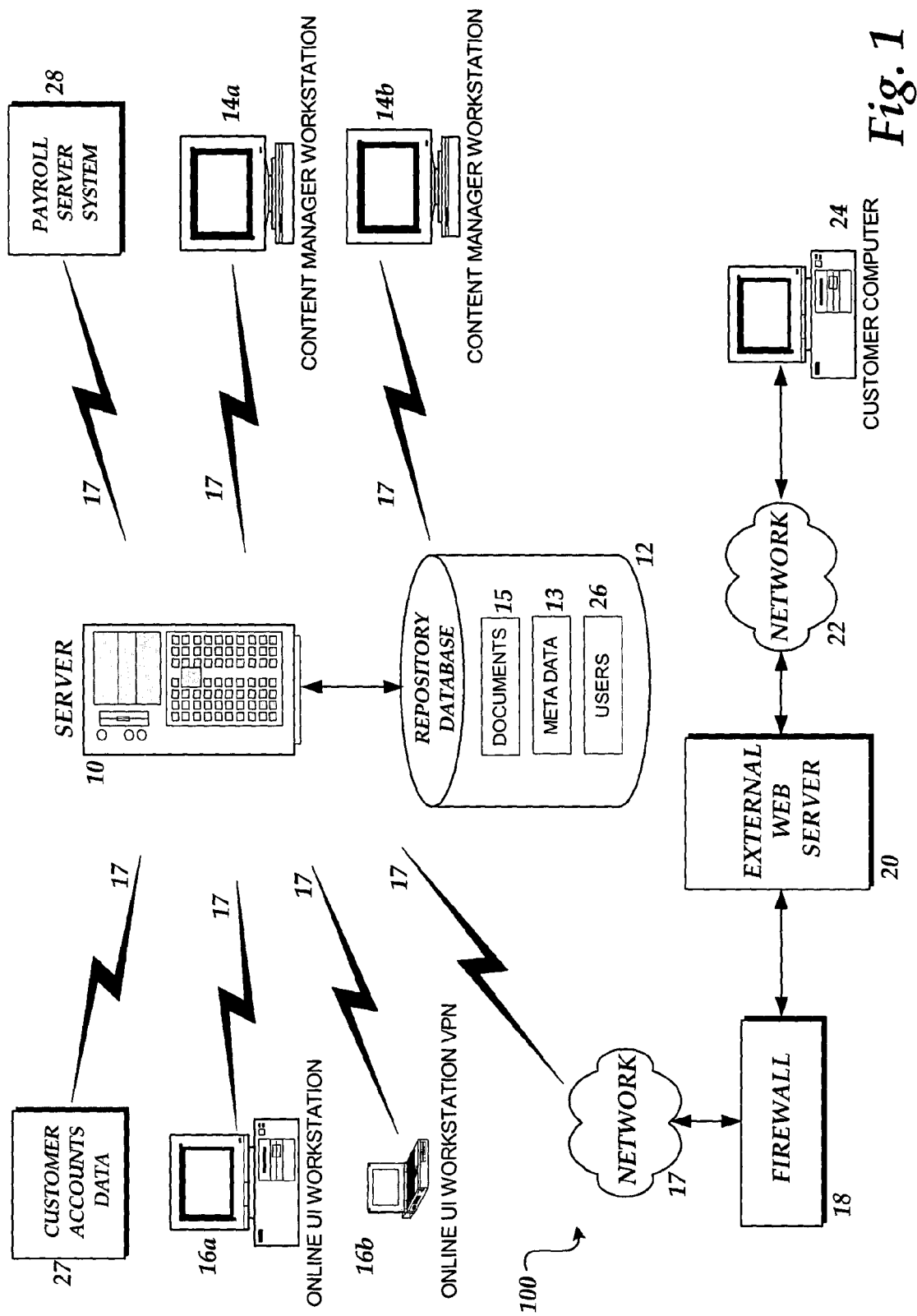
FIG. 1 is a schematic diagram showing the architecture of a client workstation, server, and database network that provides an illustrative operating environment for embodiments of the present invention.
Figure 2:
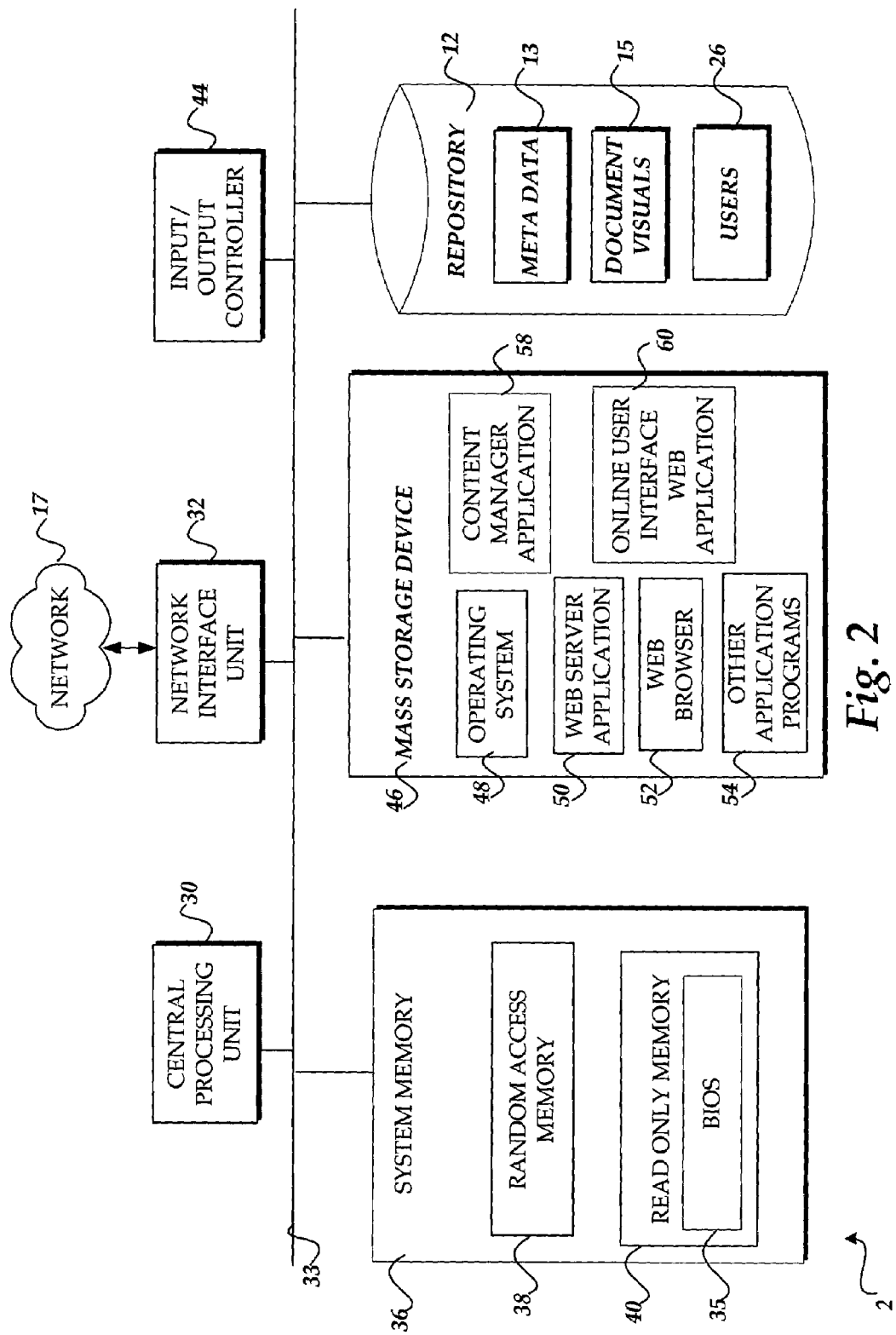
FIG. 2 is a block diagram showing the architecture of a personal or server computer that provides an illustrative operating environment for embodiments of the present invention.

Referring now to the drawings in which like numerals represent like elements throughout the several figures, aspects of the present invention and the exemplary operating environment will be described. FIGS. 1–2 and the following discussion are intended to provide a brief, general description of a suitable computing environment in which the invention may be implemented. While the invention will be described in the general context of application programs that run on an operating system in conjunction with a personal or server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative architecture of the system 100 utilized in an actual embodiment of the present invention will be described. As shown in FIG. 1, a server computer 10 is provided that operates in conjunction with the repository database 12, such as manufactured by ORACLE CORPORATION of Redwood, Calif., where among other data one copy of each document visual 15, associated metadata 13, and a listing of authorized users 26 are stored.

The database 12 receives and stores a series of tables making associations or assignments among and between the data and the metadata. For example in a directory advertising sales context, the database may store tables for various attributes that relate to the documents including business or geographic divisions, directories associated with the documents, and main and sub-categories that describe the documents. The database also stores linking tables that, among other associations, make associations between the documents and categories, documents and divisions, and documents and directories. The database 12 also houses multiple views of the database based on the database role or roles assigned to the user. The relationship between the database roles and the views is stored in the division table in the database. Additional details regarding the division table will be discussed below with regard to FIG. 10. The content manager application also creates and utilizes templates that are housed in the database to automatically populate common metadata for similar documents without having to prompt entry of metadata for all the required fields.

The content manager workstations 14a/14b represent one or more network-attached computers connected to the network 17 that are capable of executing a database content manager application, such as written in VISUAL BASIC.NET from MICROSOFT CORPORATION of Redmond, Washington. The server computer 10 is equipped with a standard web server application capable of storing web pages and receiving and responding to requests for the web pages over the network 17. For instance the online user interface workstation computers 16a/ 16b, representing one or more network-attached computers, may request web pages from the server computer 10 over the network 17. The online user interface workstation computers 16a/16b may comprise workstations for directory advertising sales representatives and are capable of executing a standard web browser application such as INTERNET EXPLORER from MICROSOFT CORPORATION of Redmond, Washington. The server computer 10 produces the web pages via a web server application such as INTERNET INFORMATION SERVER from MICROSOFT CORPORATION of Redmond, Washington.

The content manager workstations 14a/14b may load the data and associated metadata, onto the database 12 via the network 17, such as the Internet or a secure intranet guarded by the firewall 18. For example, data and metadata such as the documents 15 supporting the sale of directory advertisements and the user profiles 26 may be loaded or published onto the database 12. In the alternative, the user profiles 26 may be retrieved from a remote payroll server system 28 during a batch process whenever a new user is added to the server system 28. Similarly, an authorized user may be removed from the database 12 whenever that user is removed from the payroll server system 28. This is accomplished through a standard procedure stored in the database 12 and called periodically during a batch job. Existing data and the associated metadata may be continually maintained and updated via batch procedures and the content manager workstations 16a/16b.

In response to a request from a user of the online user interface workstation 16a/16b (hereinafter workstation 16a/16b) for customer account histories, the server 10 may retrieve the purchasing history of the requested customer for the past five years from a remote data warehouse 27. This history is downloaded to the server via the network 17 and viewed at the workstation 16a/16b, The workstations 16a/16b may access the network 17 via an Internet connection, a direct intranet connection, or authorized dial-up connection such as the virtual private network ("VPN"). Once requested documents are retrieved and delivered to a workstation 16a/16b, the interface application is operative to associate the documents into a presentation and post the presentation or the individual documents to a website via and external web server 20. The website and thus the presentation may then be accessed by the personal computer 24 representing customers or prospects who desire to view the presentations via the network 22 such as the Internet. The posted presentation of document may be accessed by a link sent to the customer via electronic mail or by using a pass-code.

With reference to FIG. 2, an exemplary system for implementing the invention includes a conventional personal or server computer 2, including a central processing unit 30, a system memory 36, and a system bus 33 that couples the system memory to the processing unit 30. The system memory 36 includes read-only memory (ROM) 40 and random access memory (RAM) 38. A basic input/output system 35 (BIOS), containing the basic routines that help to transfer information between elements within the personal computer 2, such as during start-up, is stored in ROM 40. The computer 2 further includes a mass storage device 46 for storing an operating system 48, a web server application 50 and/or a web browser application 52, and other application programs 54, such as a faxing and word processing programs such as FAXPRESS from CASTELLE CORPORATION of Morgan Hill, Calif. for faxing documents, PDFMERGE from THINK121 INCORPORATED of Harwick, Pa. for merging functionality, KRYSTAL FORMS from KRYSTAL SERVICES of Ontario, Canada, and ADOBE ACROBAT from ADOBE SYSTEMS INCORPORATED of San Jose, Calif. The mass storage device 46 may also store the content manager application 58 or the user interface web page application 60. The computer 2 is also capable of interacting with the repository database 12.

The mass storage device 46 is connected to the CPU 30 through a mass storage controller (not shown) connected to the bus 33. The mass storage device 46 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 2 operates in a networked environment as shown in FIG. 1 using logical connections to remote computers through the network 17, such as the Internet or a local area network. The computer 2 may connect to the network 17 through a network interface unit 32 connected to the bus 33. It should be appreciated that the network interface unit 32 may also be utilized to connect to other types of networks and remote computer systems. The computer 2 may also include an input/output controller 44 for receiving and processing input from a number of devices, including a keyboard or mouse (not shown). Similarly, an input/output controller 44 may provide output to a display screen, a printer, or other type of output device.

Figure 3:
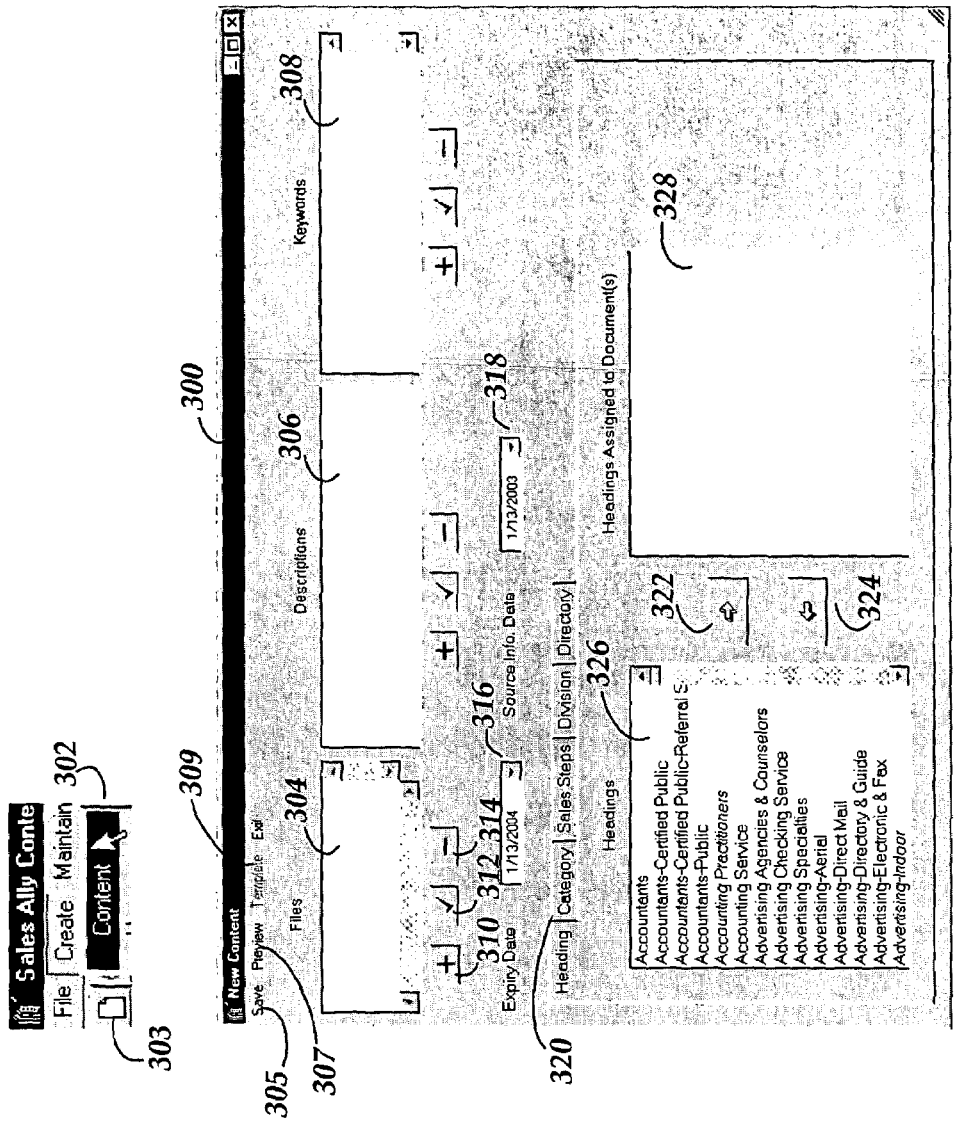
FIG. 3 illustrates computer screen displays showing menu access and an illustrative administrative interface utilized by an administrator for creating and storing document visuals in a repository database according to an embodiment of the present invention.

FIG. 3 is a computer screen display showing an illustrative administrative interface utilized by an administrator for creating and storing new document visuals and associated attributes in the repository 12 according to an embodiment of the present invention. The primary purpose of the content manager application 58 is publishing (creating and storing) and maintaining document visuals and associated metadata to the repository 12 for use by business representatives and websites. The administrator who has been tasked with loading or creating new content or documents into the repository 12 opens the new content screen 300 by selecting 'content' from the create menu 302 or by clicking on the new content button 303 displayed on the content manager workstation 16a/16b, The administrator may use various areas and functions on the new content screen 300, (hereafter screen 300) including the save function 305 that updates the database with the associated metadata or attributes. The attribute tabs 320 facilitate the assignment of attributes to the document files opened and displayed in the file area 304. Once attributes are assigned, the save function 305 moves the corresponding document visual to a designated area on the database or repository 12. No database 12 updates or file moves are made until the save function 305 is selected.

The preview function 307 displays the actual document visuals on the administrative interface for preview prior to moving them to the database 12. This permits confirmation that the correct attributes are assigned and that the document file is not corrupt. The administrator may also use the template function 309 to automatically populate the screen 300 based upon the template selected. Some of the documents may have the same attributes as previous document visuals thus making the template function 309 an efficient means of publishing content without re-keying or manually entering the attributes. For instance documents related to plumbers may be assigned attributes through an existing template, accessed by template function 309, established for plumber related materials.

The administrator may utilize the add button 310 when desiring to add or open document files. Once selected the add button 310 displays a dialog box to open one or more document files made available for loading. The change button 312, when selected displays a dialog box to replace the selected file in the file area 304. It should be appreciated that after saving a document to the database 12, edits may be made to the document without changing the attributes or updating the database by using the change button 312 to replace the document file. The delete button 314 deletes the selected file in the file area 304. Similarly there are add, change, and delete buttons for the description area 309 and the keyword area 308 that independently perform the same functions for the respective areas above the buttons. The description area 306 is for entering an attribute description of the document in the file area 304 directly adjacent to the description entry. Similarly, the keyword area 308 is for entering attribute keywords associated with the document file in the file area 304 directly adjacent to the keyword entries.

The attribute tabs 320 facilitate the display, assignment, and revocation of the attribute metadata associated with the documents being loaded into the database 12. For instance, in a directory advertising sales database attribute tabs 320 for headings, categories, sale or business steps, geographic or business divisions, and directories are operative to assign attribute metadata to each document. Each tab has an assign button 322 and a revoke button 324. The assign button 322 assigns the selected attributes from the attribute tabs 320 to the document files in displayed the file area 304 of the screen 300. When the attributes are assigned they are moved from the available text box 326 to the assigned text box 328. Similarly, the revoke button 324 revokes the selected assigned attributes from the document files displayed in the file area 304 and moves the attributes back to the available text box 326. The life cycle management of each document is facilitated by the entry of the source information date 318 denoting the date the data contained in the documents displayed in the file area 304 was published, recording of a creation date denoting when each document is added to the repository, recording of an update date denoting when a document is updated, and entry of the expiry date 316 denoting when the documents displayed in the file area 304 will show as expired in the system 100. It should be appreciated that documents that expire are not removed from the system on the expiry date but show as inactive. Documents are purged or deleted from the database 12 via the content manager application 58.

Figure 4:
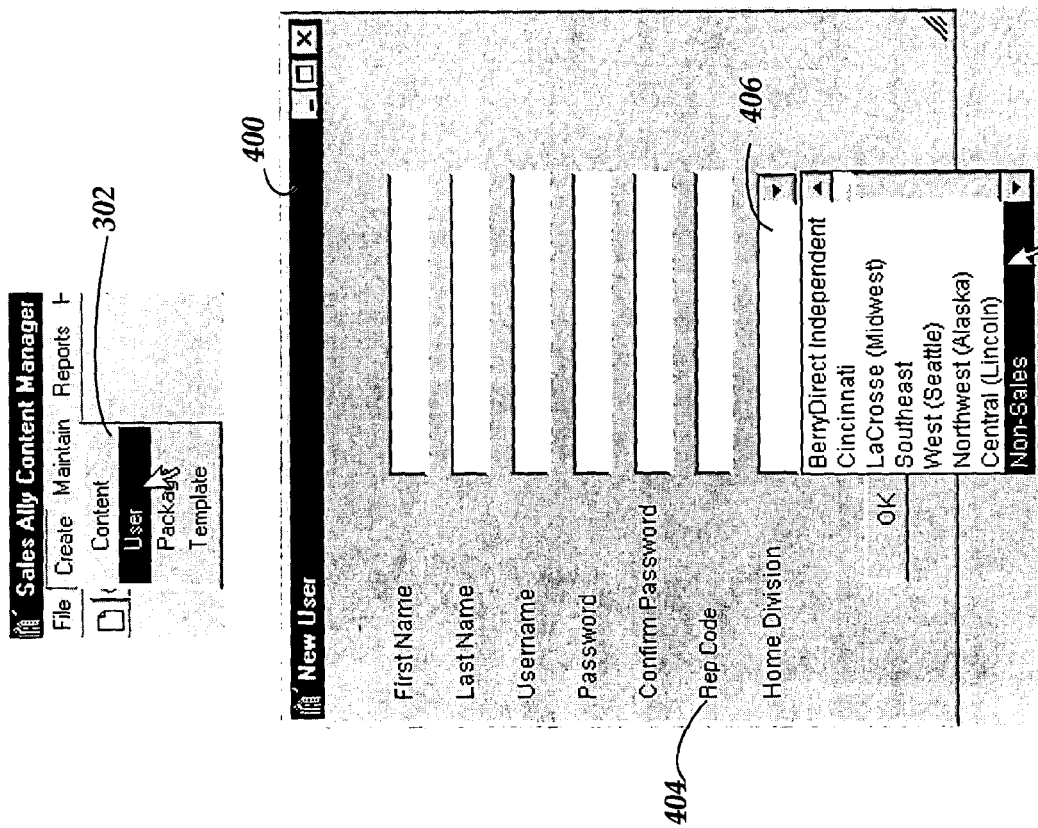
FIG. 4 illustrates computer screen displays showing menu access and an illustrative administrative interface utilized by an administrator for creating and storing user profiles in a repository database according to an embodiment of the present invention.

FIG. 4 is a computer screen display showing an illustrative administrative interface utilized by an administrator for creating and storing user profiles in a repository database according to an embodiment of the present invention. A user is setup in the database 12 before they are authorized to access document visuals via the workstations 16a/16b, The user table may be updated via the content manager application 58 executing on workstations 14a/14b, An administrator may access the new user screen 400 and create a user profile by selecting 'user' from the create menu 302. The administrator will complete all the fields on the new user screen 400 including the rep code 404 and the home or primary division 406 assigned to the user. For instance, in an advertising directory sales environment a user may be a sales representative for a particular business segment or geographic region, a sales manager, a non-sales employee, or an administrator. Based on the home division 406 assigned to the user, the content manager application 58 will also assign a database role to the user based upon the role field in the division table. The database role will determine what view of the database 12 the user will have access to and thus what documents will be searched in response to queries from the user. Additional details regarding the division table will be discussed below with regard to FIG. 8.

As briefly mentioned above, the user table may also be updated automatically from a remote payroll system 28 during a batch update. When new employee sales reps or users are added to payroll their user profile is created from a download to the database 12 such that a database role is assigned to the employee or revoked when the employee is removed from the payroll system 28. In addition to being assigned a primary division and role, the user may also be assigned a temporary or secondary role. The secondary role may be active for a limited time period. Additional details regarding the assignment of secondary roles will be described below with respect to FIGS. 10 and 22.

Figure 5:
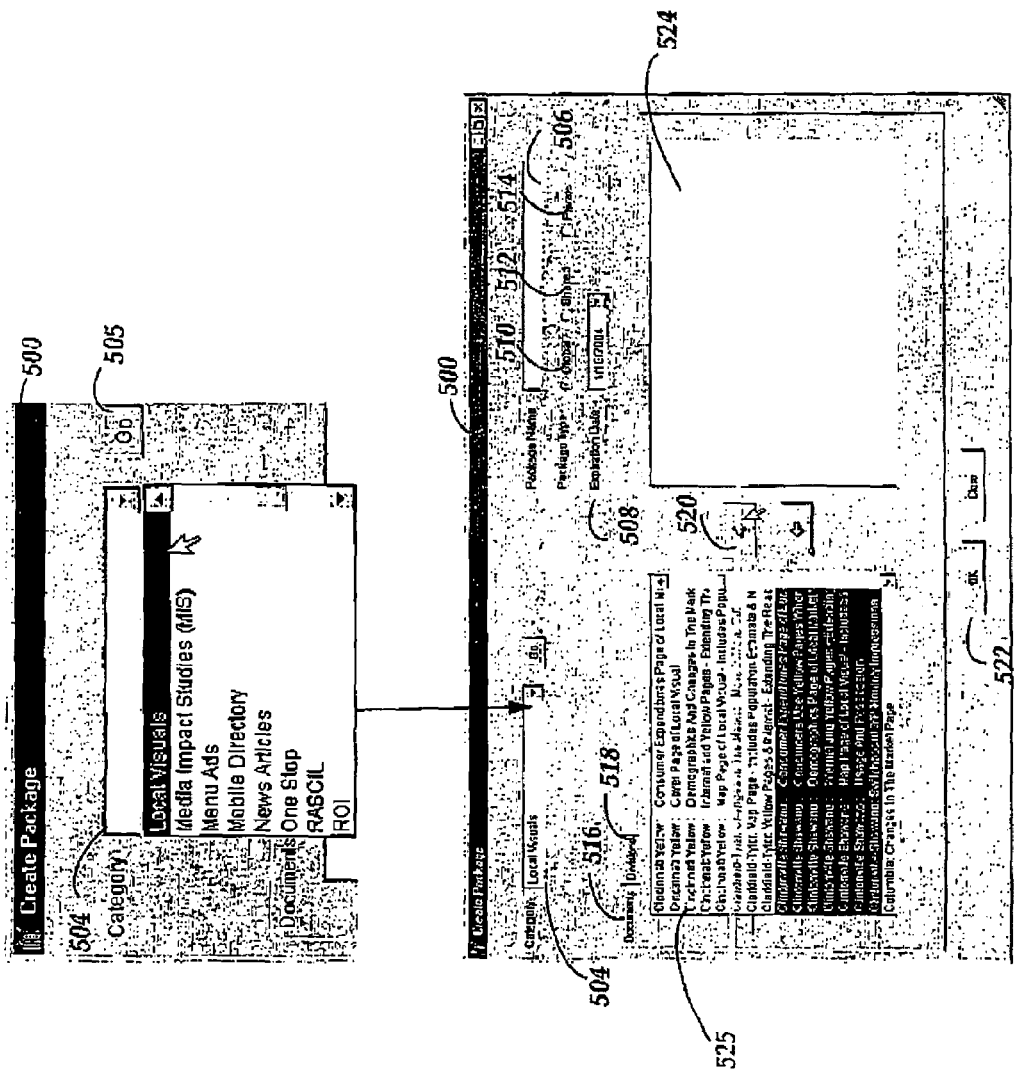
FIG. 5 is a computer screen display showing an illustrative administrative interface utilized by an administrator for associating document visuals to create and store visual presentations in a repository database according to an embodiment of the present invention.

FIG. 5 is a computer screen display showing an illustrative administrative interface utilized by an administrator for associating document visuals to create and store new visual presentations in a repository database according to an embodiment of the present invention. The create package or create presentation screen 500 (hereinafter screen 500) may be accessed via the content manager application 58 by selecting 'package' from the create menu 302. The content manager application 58 enables the user or administrator to create three types of presentations or packages that are accessible via the online user interface based upon the presentation type and the user profile. The first presentation type that may be created via the content manager application 58 is a global presentation represented by the global indicator 510. Once created by an authorized administrator the global presentation is made available to all authorized users. The global presentation may be the default presentation type and the expiration date 508 may default to one year from the current date however both fields may be changed.

A second presentation type is a shared presentation, represented by the shared indicator 512, that is created by an administrator, manager, or a user and authorized for sharing with an entire geographic or business division by a manager or administrator. A third presentation type is a private presentation, represented by the private indicator 514. Users or administrators may create private presentations that are accessible by the creator and the manager of the division assigned to the presentation. The screen 500 has a category dropdown list 504, containing all categories regardless of the main or super-category to which the category is assigned. The bottom portion of the screen 500 contains two tabs, the document tab 516 and the division tab 518. Similar to FIG. 3, each tab is divided into two parts the left side showing what is available and the right side showing what is assigned. The dropdown list 504 is used to select the subcategory or category of visuals then the go button 505 is selected to render a display list of visuals to choose from in the documents tab 516 for inclusion in the presentation being created.

The example shown in FIG. 5 selects from all the local visuals available in the database. The administrator may then select from the local visuals and highlight the documents to assign to the presentation. After the documents are highlighted, selecting the assign button 520 will remove the documents from the available area 525 to display 524 on the right side. Documents are revoked as described above with regard to FIG. 3.

Similarly, the division tab 518 displays all of the business divisions available in the left list box. Once highlighted and assigned by the assign button for the division tab, the divisions with access to the presentation will display on the right. If the presentation is global all of the divisions are assigned automatically. Once all of the presentation documents have been assigned to the presentation and the divisions have been assigned, then a name is keyed in the presentation name text box 506 and the 'OK' button 522 is selected to save the presentation to the database 12. It should be appreciated that when presentations are created, entries that point to the actual documents and not the actual documents are created. Thus when a document is updated in the database 12 it is updated in all the presentations to which the document is assigned.

Figure 6:
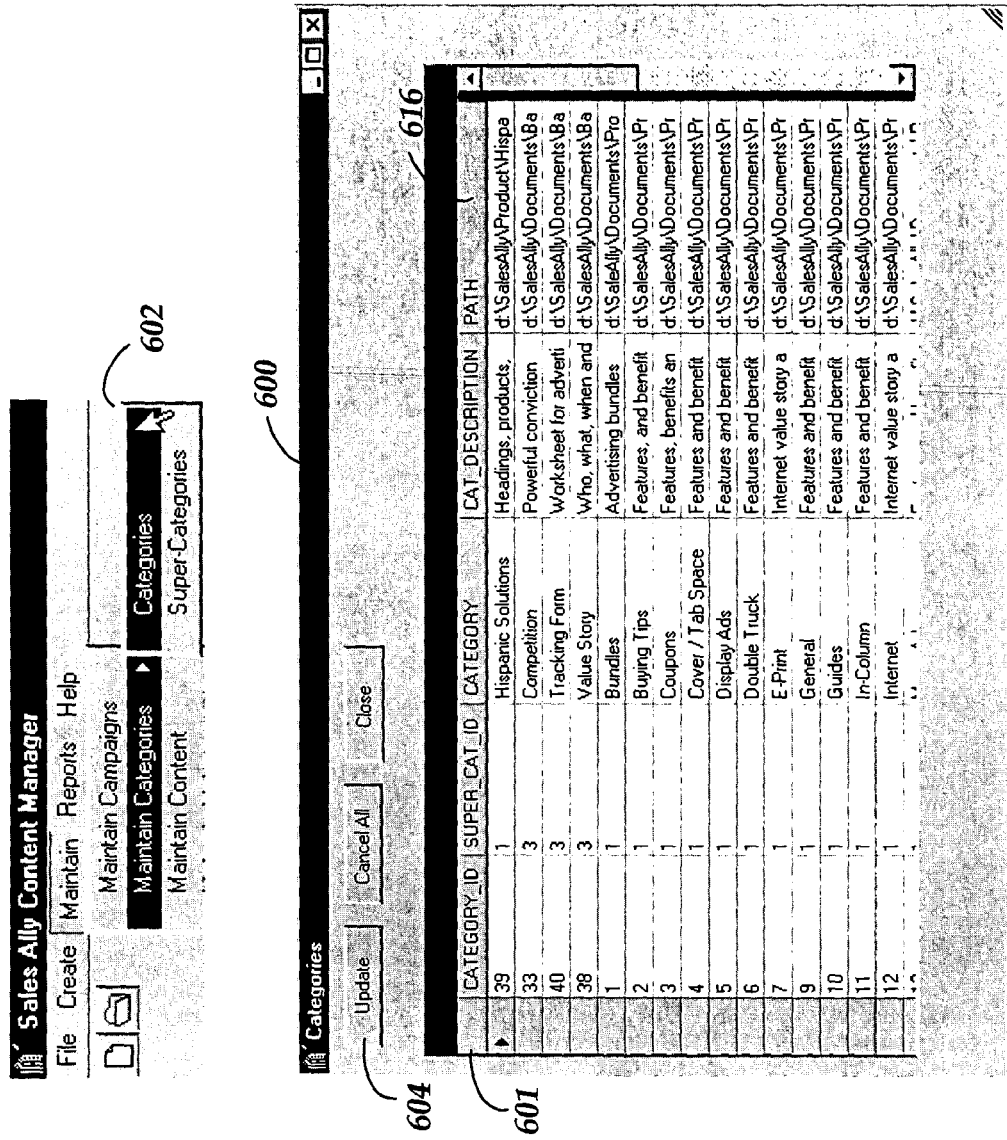
FIG. 6 is a computer screen display showing an illustrative administrative interface utilized for updating a category attribute table according to an embodiment of the present invention.

FIG. 6 is a computer screen display showing an illustrative administrative interface utilized for updating a category attribute table according to an embodiment of the present invention. The category attribute screen 600 displaying the subcategory or category table 601 is accessed by selecting 'Maintain Categories' from the maintain menu 602 within the content manager application 58. The category table 601 works in conjunction with a main category or Super-Category table to organize the database content and make it easy for the user to locate visuals. Every category is associated with at least one super-category and every document visuals in the database 12 is associated with a category and super-category. Super-Categories are used to broadly classify the document visuals. For instance, in an advertising directory business the Super-Categories may include: 1. Local document visuals and Rates—documents related to directories in local regions/markets or listing the cost of advertising in local hard copy or Internet directory versions, 2. Product Visuals—documents associated with directory products, 3. Basic Business Directory or 'Yellow Pages' Visuals- documents related to the yellow pages, and 4. Heading Visuals—documents associated with certain directory headings.

The categories contained in the category table 601 are the primary way for organizing the varied document visuals within the database 12. For instance, in the directory advertising business, categories may include maps, rates, demographic studies, testimonials, display ads, in-column ads, Internet ads, etc. Categories also define the category directory path 616 where a particular group of document visuals are physically store in the database 12 and how to display the document visual on the user interface workstations 16a/16b based on the super-category associated with the document. The category directory path 616 is also used by the online user interface to retrieve a visual such as to view, print, fax, or download the document visual. The category table 601 may be updated by highlighting the row in which a change is desired or the last row in the table, keying the change or pressing the delete key on the keyboard, and selecting the update button 604 to apply the change or deletion to the database 12. It should be appreciated that if there are document visuals associated with the category, a deletion is prohibited until the document associations are purged from the database 12.

Figure 7:
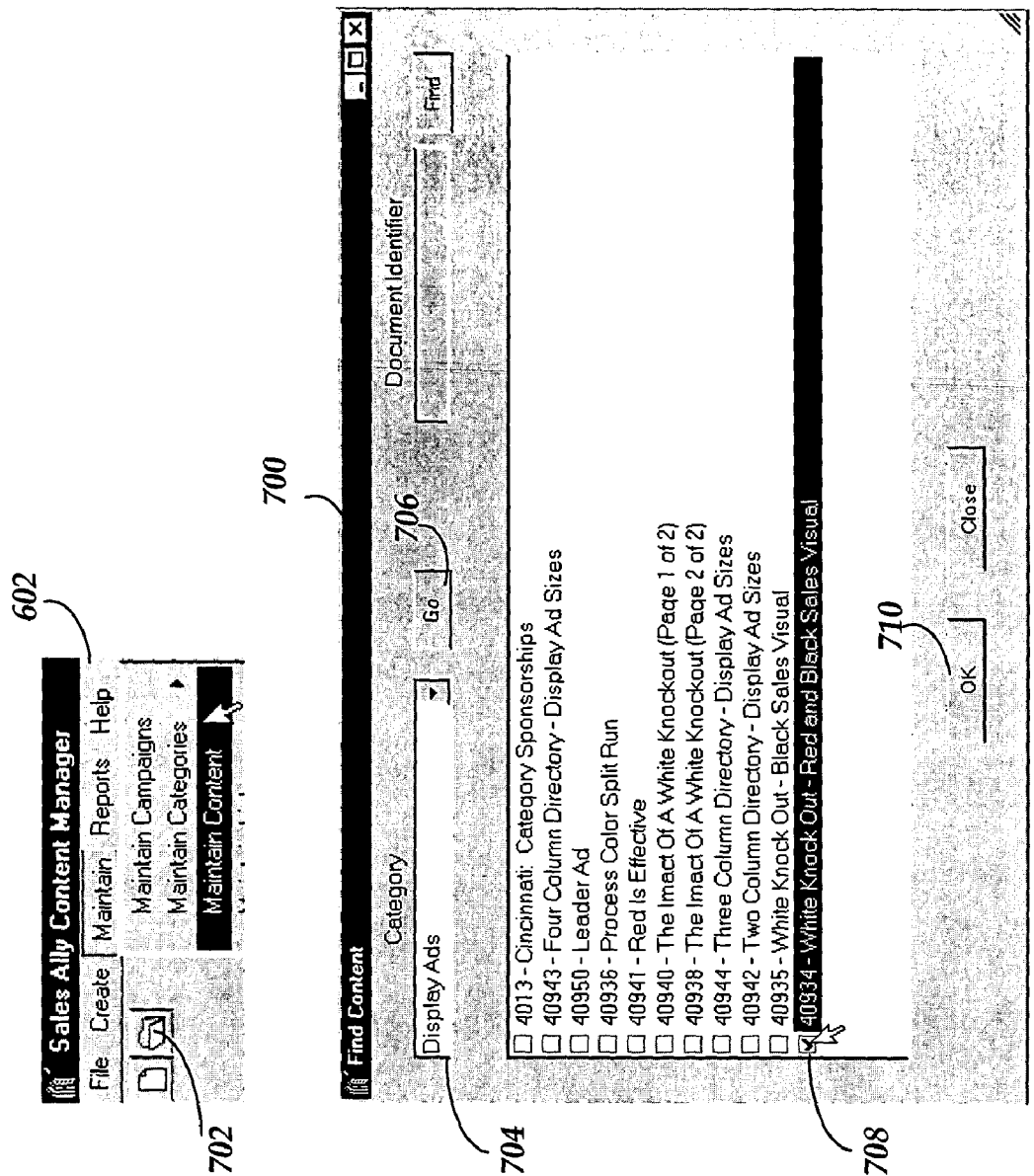
FIG. 7 is a computer screen display showing an illustrative administrative interface utilized in selecting a document visual for update according to an embodiment of the present invention.

FIG. 7 is a computer screen display showing an illustrative administrative interface utilized in selecting a document visual for modification or edit according to an embodiment of the present invention. Before the edit content screen is displayed, it is necessary to identify to document visuals to be edited in the find content display 700. The find content display 700 is accessed by selecting 'Maintain Content' from the maintain menu 602. In the alternative, the display 700 may be accessed by selecting the edit existing content button 702. The find content display 700 is used to locate and earmark the document visuals, which are sorted in document name order, for editing. To locate and earmark one or more document visuals for edit the category to which the documents belong is selected from the category dropdown list 704. The 'GO' button 706 is then selected to display the documents for the selected category. Documents for editing are then identified by selecting the checkbox 708 to the left of the desired document. Selecting the 'OK' button 710 then displays the edit content screen with the selected documents opened and the attributes populated. The edit content screen operates in the same fashion as the new content screen 300 described above with respect to FIG. 3. If multiple documents are selected on the find content display 700, the documents will be opened one screen at a time for editing in the order that the document visuals are displayed on the find content display 700. As described briefly above, it should be appreciated that an edit to only the document visuals and not the attributes or database 12 may take place by utilizing the replace function as described in FIG. 3.

Figure 8:
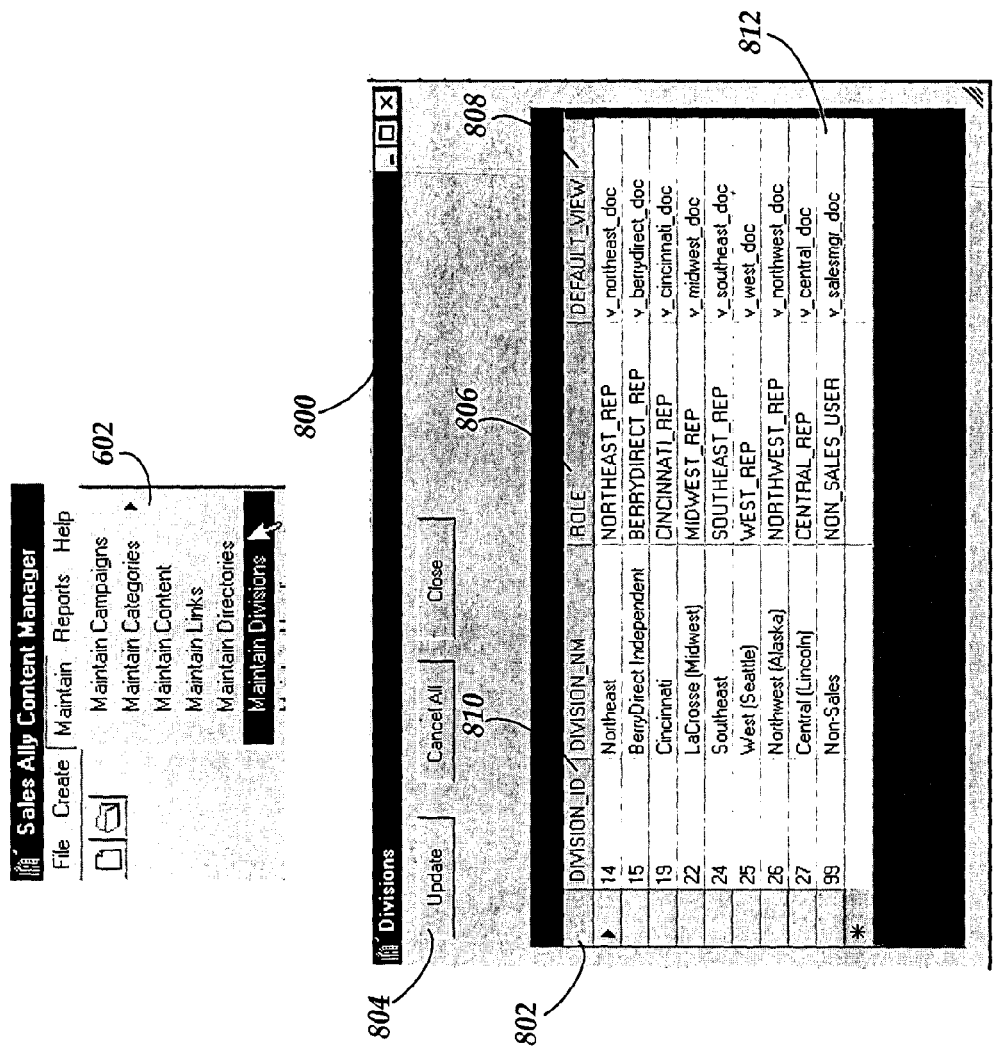
FIG. 8 is a computer screen display showing an illustrative administrative interface utilized by an administrator in modifying a division attribute table according to an embodiment of the present invention.

FIG. 8 is a computer screen display showing an illustrative administrative interface utilized by an administrator in modifying a division attribute table according to an embodiment of the present invention. The division table 802 defines the geographic or business divisions within the database 12. Each user is assigned to at least one division and can view content associated with at least one division. The division update screen 800 is accessed by selecting 'Maintain Divisions' on the maintain menu 602. The division table 802 includes the default database roles 806 and the default views 808 corresponding to the roles 806. The rights and permissions for a user are based upon their user profile and database role. For example if a user profile list the user as a non-sales employee in the Northeast division, the user will be assigned the non-sales role and the 'salesmgr' view 812 of the database 12. The combination of the user profile and role determines access and update privileges. The default views 808 are established with each division and provide access to just that divisions content. The default view for managers 812 provides access to the content of all divisions and all the private presentations of the home division of the manager or user. The manager view 812 also provides administrative access that other users do not have. The division identifiers 810 uniquely identify the divisions and relate the divisions to the other tables. The division table 802 is updated in the same manner as described above with respect to category table updates in FIG. 6.

Figure 9:
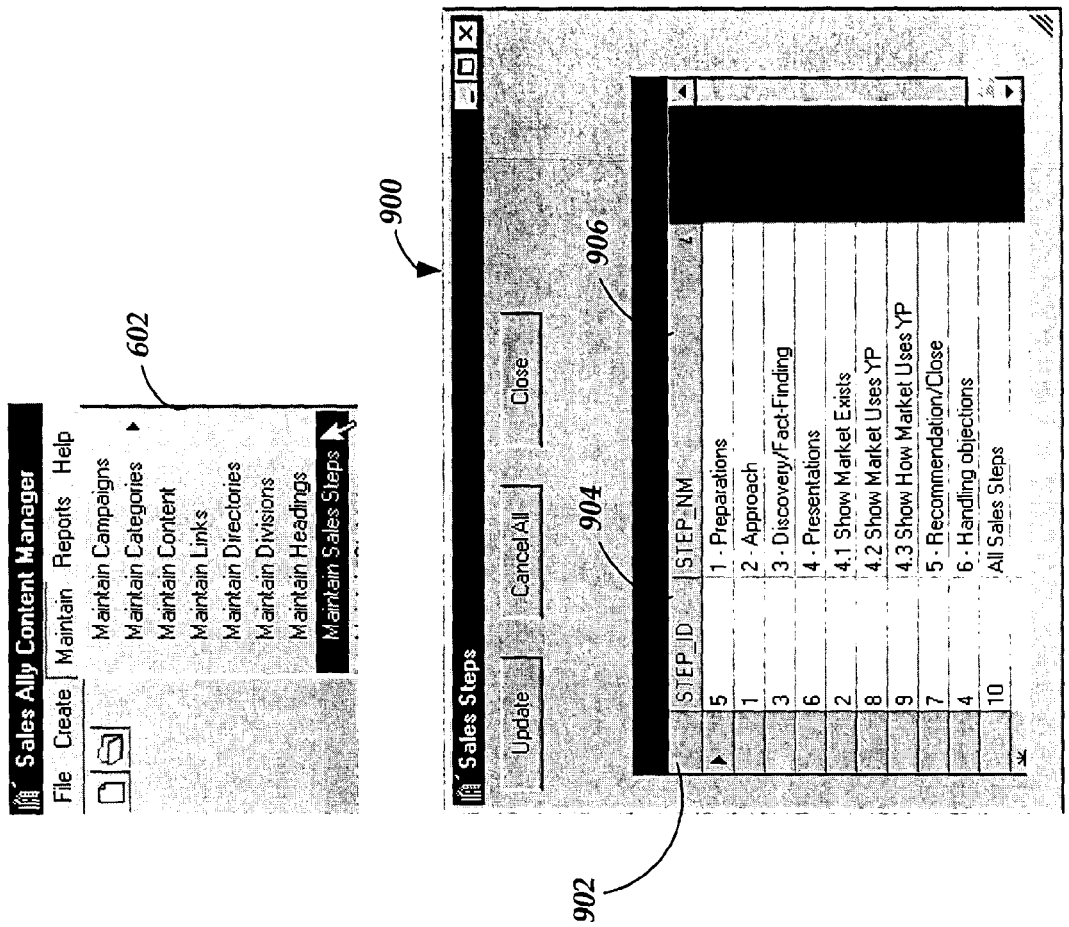
FIG. 9 is a computer screen display showing an illustrative administrative interface for modifying a sales steps attribute table according to an embodiment of the present invention.

FIG. 9 is a computer screen display showing an illustrative administrative interface for modifying a business process steps attribute table according to an embodiment of the present invention. As an example in the directory advertising business, the business process display 900 is accessed by selecting 'Maintain Sales Steps' from the maintain menu 602. 'Steps of sale' is separate and distinct from categories and super-categories described above. A document visual may be associated with any category and super-category and also any sales or business step. The sales steps table 902 includes the step identifiers 904 uniquely identifying the step names 906 to other tables. One or more steps of sale may be assigned to document visuals depending on the pertinence of the document visual to any or all steps of sale. The sales steps table 902 is updated in the same manner as described above with respect to FIG. 6.

Figure 10:
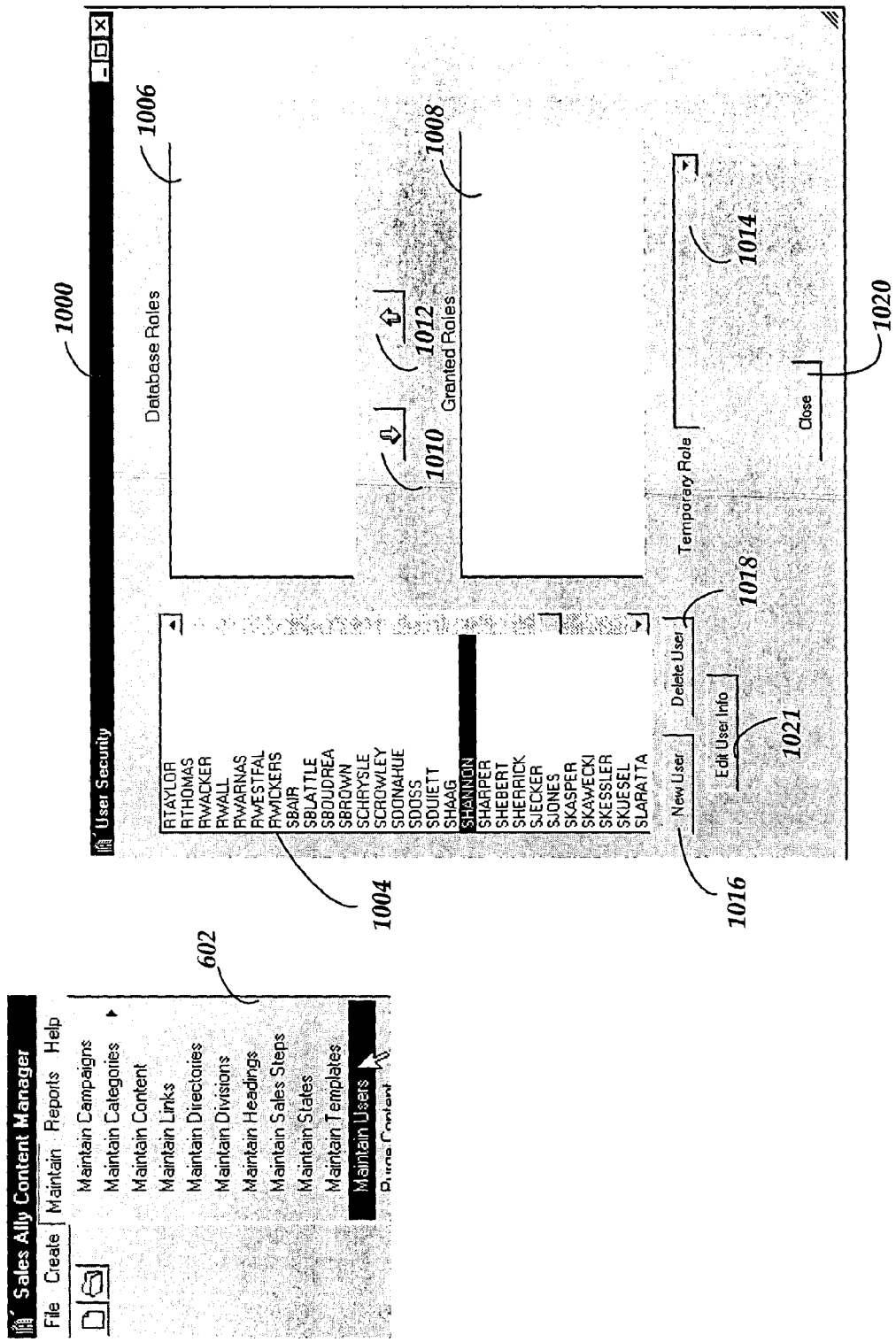
FIG. 10 is a computer screen display showing an illustrative administrative interface utilized by an administrator for modifying user security access according to an embodiment of the present invention.

FIG. 10 is a computer screen display showing an illustrative administrative interface utilized by an administrator for modifying user security access according to an embodiment of the present invention. Database roles 806 may be assigned or revoked via the user security display 1000 in the content manager application 58. The security display 1000 is accessed by selecting 'Maintain Users' from the maintain menu 602. An administrator may revise the security privileges of a user from the security display 1000. A new database role 806 may be assigned by selecting the desired username from the user listing 1004, selecting the desired role in the roles list box 1006, selecting the assign button 1010 to move the selected role to the granted roles list box 1008, and selecting the close button 1020 to update the database 12. Granted roles may be revoked by selecting the role to be revoked in the granted roles list box 1008, selecting the revoke button 1012 to remove the granted role from the list box 1008 to the list box 1006.

A user may have an additional role assigned to allow them to have access to document visuals from other divisions. When a temporary role is assigned it may be set up to automatically expire after a specified period of time. It should be appreciated that private presentations created using visuals accessible through a temporary role will remain accessible to the user even after the temporary role has expired. Temporary roles may be assigned by selecting a user from the user listing 1004, selecting a desired temporary role from the temporary role drop down list 1014, and selecting the close button 1020 to update the database 12.

Updates to user information may be initiated from the security display 1000 by selecting the edit button 1021 and updating a user table in the same manner as described above with respect to FIG. 6. New users may also be added from the security display by selecting the new user button 1016 thereby advancing the content manager application to the new user display 400 described above in FIG. 4. Existing users may also be deleted from the database 12 by selecting the user from the user listing 1004, selecting the delete user button 1018, and selecting the close button 1020.

FIG. 11 is a computer screen display showing a presentation report spreadsheet generated by the content manager according to an embodiment of the present invention. There are a variety of reports available through the content manager application 58 to manage the database 12 and its content. Available reports include: new documents showing new documents added to the database 12 in the last X days where X is a variable number, updated documents showing documents that have been modified in the database 12, expired documents showing what documents have or are about to expire, keywords by document listing all the documents and the keywords associated with each document, a presentation report listing all the presentations defined in the system, database usage tracking showing database login activity from users, the automatic directory advertising rates update report, and user reports showing user profiles. The presentation report 1100, as briefly described above is accessed via the content manager reports menu. The report 1100 lists the presentation names 1104 of all the presentations defined in the system, the usernames 1102 of the user creating the report, the create date 1106, the update date 1108 if any, the expiration date 1110 if any, and the presentation type 1112. Blank spaces for presentation type 112 represent private presentations, an 'S' represents shared presentations, and a 'G' represents global presentations which may not have an expiration date but may be deleted.

Figure 12:
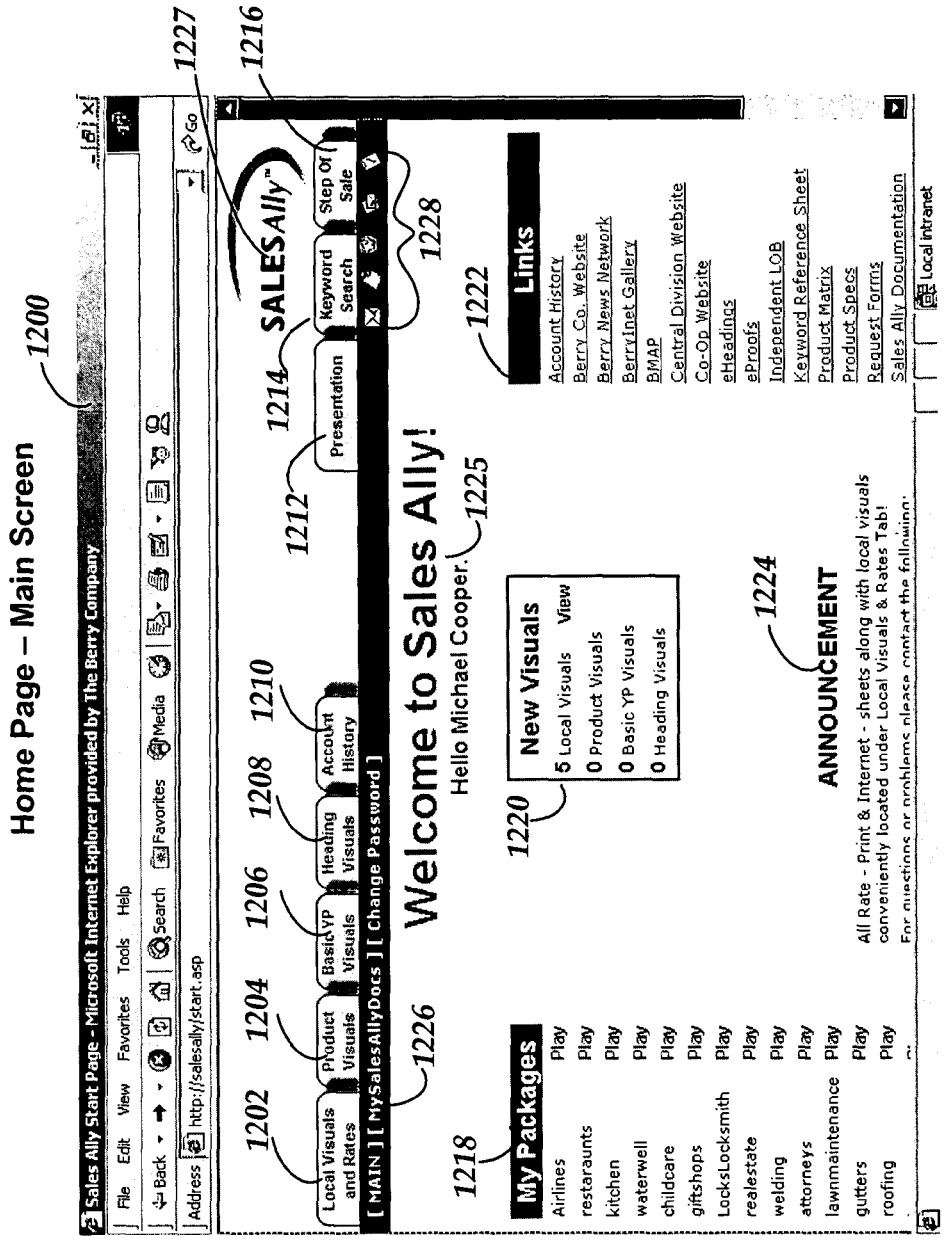
FIG. 12 is a computer screen display showing an online user interface displaying a main view of functions for selecting a desired query according to an embodiment of the present invention.

FIG. 12 is a computer screen display showing an online user interface displaying a main view of database functions for selecting a desired query according to an embodiment of the present invention. The main screen display 1200 is accessed via the online user workstations 16a/16b in response to a request to access the documents 15 by logging into the system 100 with a username and password via the network 17. For example, the user in this case is a sales representative for a directory advertising business. Based on the home division and the user profile recognized, the user receives a personal greeting 1225 on the main display 1200. The user may select database functions representing desired queries for accessing the documents 15 and return to the main screen display by selecting the logo 1227 from any online web page displaying the logo 1227. The function tabs 1202, 1204, 1206, and 1208 represent the main or Super-Categories that may be searched within the division of the assigned view 808 to retrieve document visuals the user desires.

The account history tab 1210 allows the user to enter a customer identification number, for instance a telephone number, and retrieve an account or purchasing history of the customer or advertiser from a remote data warehouse 27. The presentation tab 1212 allows the user to query and retrieve document visuals by presentation, add the retrieved document visuals to existing presentations, rename presentations, make shared and global presentations private, or merge presentations to create new presentations. The keyword tab 1214 allows the user to enter key words and query the database 12 for documents having the keywords regardless of the category or super-category of each document. The step of sale tab 1216 allows the user to enter a query and initiate a search and retrieval document visuals associated with certain steps of sale. The icons 1228 allow the user to conveniently access electronic mail and message features from the user interface or screen display.

The 'My Packages' selections 1218 allow the user to play or modify the existing private presentations accessible by the user. The 'New Visuals' section 1220 allows the user to quickly view document visuals added since the last login. The 'Links' selections 1222 allow the user to access related websites by selecting the appropriate link. The user may also view the marketing announcements 1224 from the main display 1200. Also by selecting the 'MySalesAllyDocs' link 1226 the user is able to display the folder structure of downloaded document visuals, search results, and presentations in order to review and/or remove items no longer needed. Additional details regarding the database functions and features available from the main screen 1200 will be described below with regard to FIGS. 13A–23.

Figure 13A:
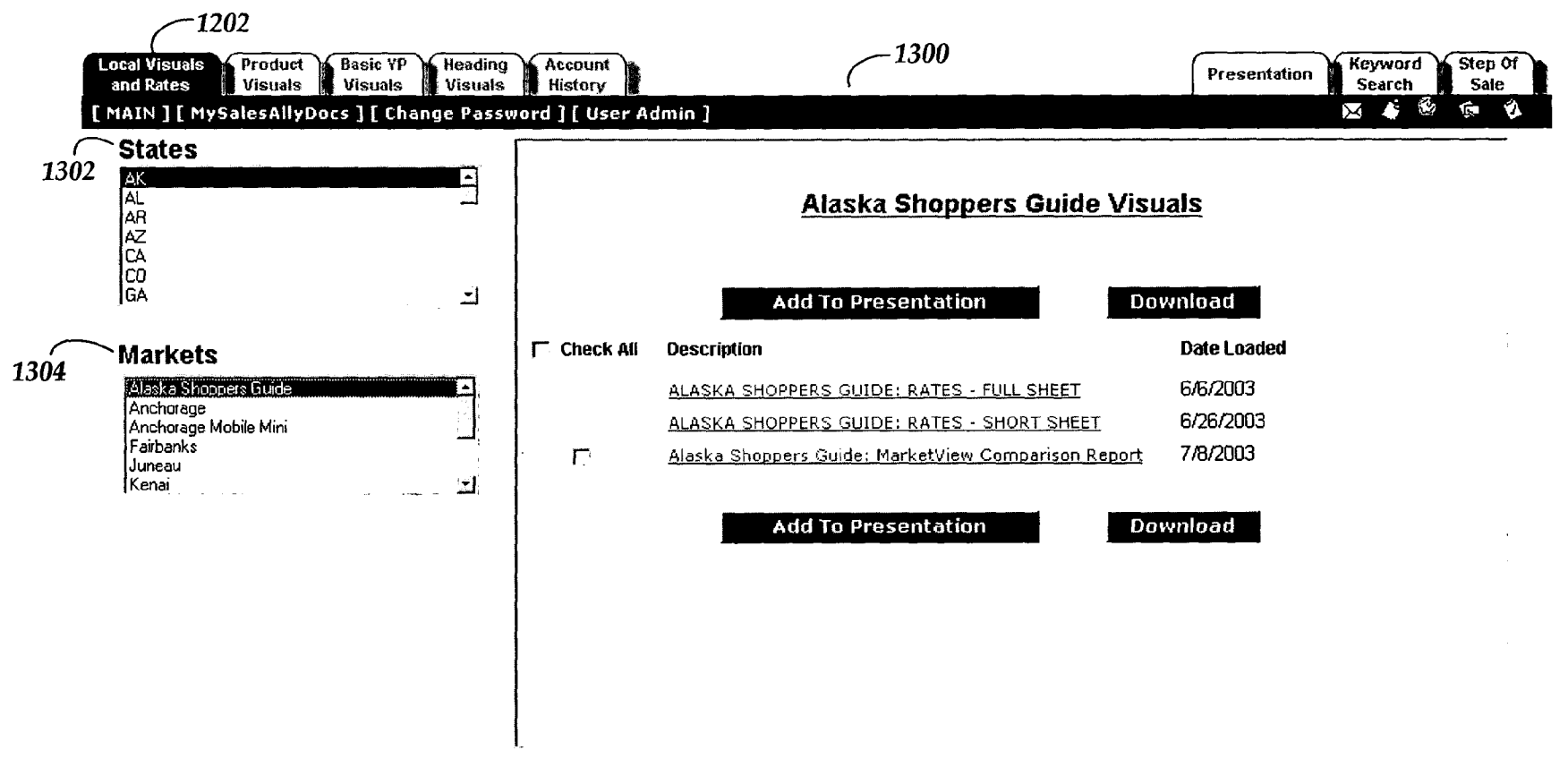

FIG. 13A is a computer screen display showing an online user interface displaying a view of a super-category function utilized in the search and retrieval of documents according to an embodiment of the present invention. Screen display 1300 represents the view after selecting the local visual and rate tab 1202. Selecting the local visual and rate tab 1202 allows a user to query for document visuals related to local directories, such as local maps and demographics, and rate sheets reflecting the cost by selecting a state in the state menu 1302. The user may further narrow the query by selecting a market or directory from the market menu 1304 based on the selected state. States or markets that do not have existing documents in the database 12 associated with them may not be displayed in the menus 1302 or 1304.

FIG. 13B is a computer screen display showing an illustrative administrative interface utilized for updating a directory attribute table according to an embodiment of the present invention. The directory table 1311 supports the screen display 1300. Each directory name 1316 is associated with a state listed in the state menu 1302 and associated in the state column 1313 of the directory table 1311. Thus when a state is selected in display 1300, the directories or markets associated with the selected state are listed in the market menu 1304. Each directory also has a directory number 1312 and an Internet directory number 1314 associated with the directory. The directory table may be updated as described above with respect to FIG. 6.

Once the state and market have been selected the user may choose from multiple document delivery options. The user may view, print, fax, email or download the retrieved documents. The user may print the document visual by selecting the document then selecting a print icon. The user may also add the retrieved document visuals to existing presentations or use them to create new presentations. The user may also post the documents or presentations to a website for customers or prospects to access them over the Internet. Additional details regarding document and presentation delivery options will be described below with regard to FIGS. 14A–14B and 19A–19C.

Figure 14A:
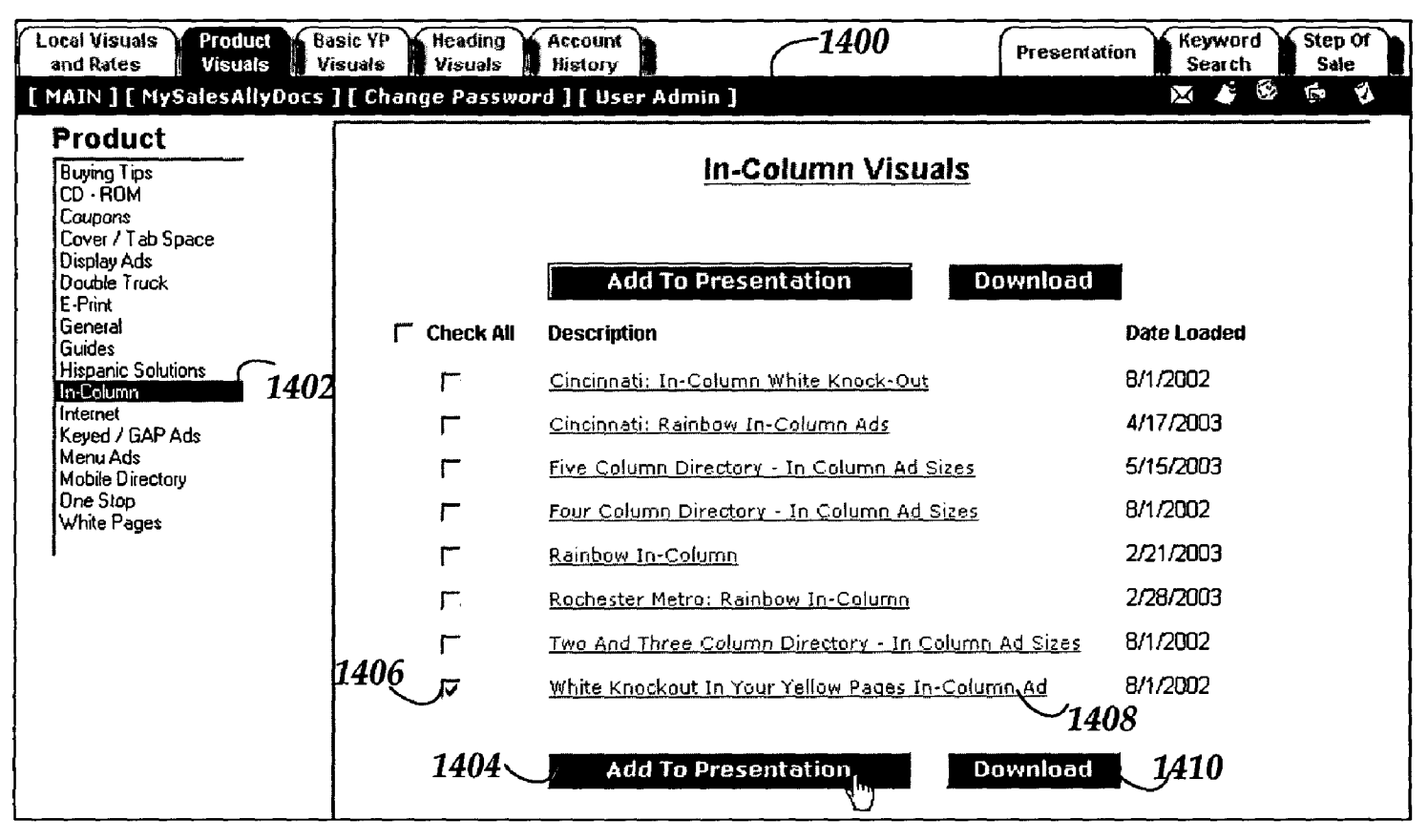
Figure 14B:
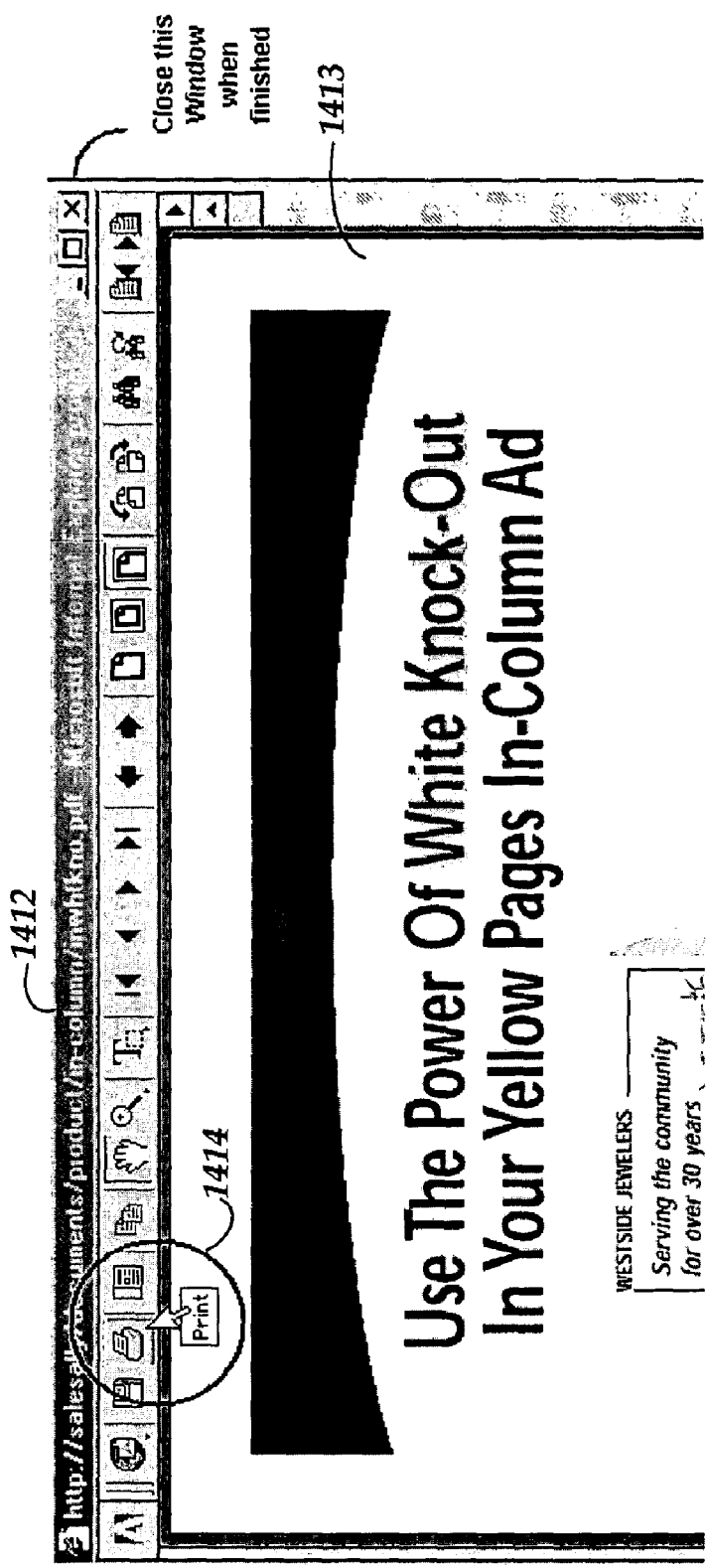

FIGS. 14A–14B are computer screen displays showing an online user interface displaying views of a super-category function utilized in the search and retrieval of data according to an embodiment of the present invention. FIG. 14A shows screen display 1400 that is accessed in response to a selection of the product visual tab 1204 and the 'In-column' product 1402. Among the In-column visuals retrieved the user may view the visual by selecting the link 1408 and/or select the document checkbox 1406 to earmark the visual for additional processing. Referring now to FIG. 14B, if the user chooses to view the visual by selecting the link 1408, the actual In-column visual 1413 will appear on the screen display 1412. The visual 1413 may then print by selecting the print icon 1414. Turning back to FIG. 14A, after checking the document visual, the user may download the visual 1413 to the local computer 16a/16b by selecting the download button 1410. Once downloaded, the document visual 1413 may be electronically mailed or faxed to customers or prospects. The user may add the visual 1413 to a presentation by selecting the 'add to presentation' button 1404.

Figure 15:
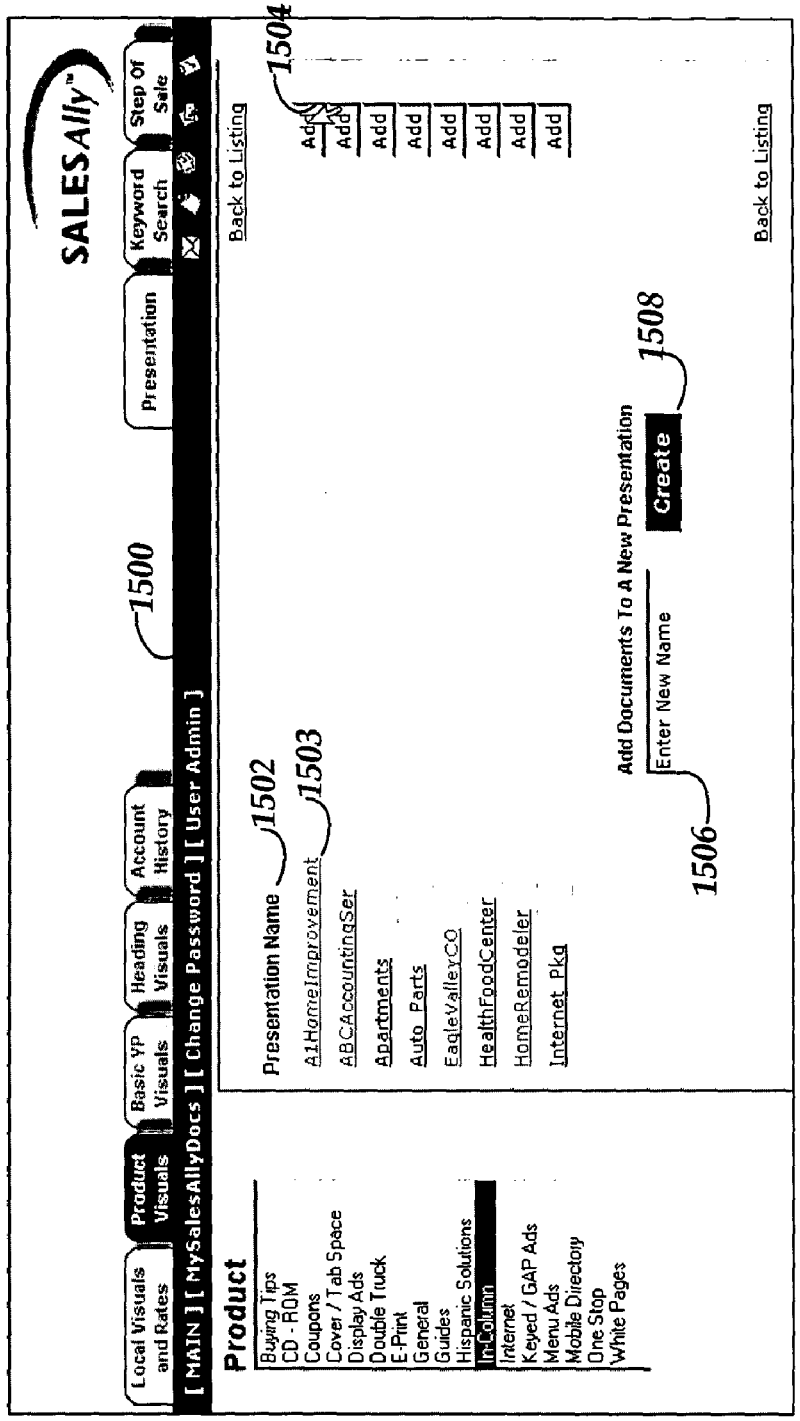
FIG. 15 is a computer screen display showing an online user interface displaying a view of functions for selecting a desired presentation to add a document to or for creating a new presentation with a document according to an embodiment of the present invention.

FIG. 15 is a computer screen display showing an online user interface displaying a view of the system 100 functions for selecting a desired presentation to add a document to or for creating a new presentation with a document according to an embodiment of the present invention will be described. The screen display 1500 is rendered on the user workstation 16a/16b in response to selecting the 'Add To Presentation' button 1404 in FIG. 14. The display 1500 shows the names of available presentations 1502 that may receive the document 1413 and any other checked documents as part of the presentation. The user may select a presentation to add the document visuals to by selecting the add button 1504 adjacent to the desired presentation. In the present embodiment the presentation 1503 may be selected for adding the document visual 1413 by selecting the add button 1504. A display window (not shown) acknowledging that the selected documents have been successfully added to the presentation will be displayed. Closing the window will return to the display 1500. The display 1500 also shows the create button 1508 that when selected will start a new presentation with the document visuals checked prior to selecting the button 1404. When a name is entered in the name field 1506 and the create button 1508 is selected, a new presentation is created with the document visuals previously checked. The documents will appear in the presentation in the order they appeared in the display 1400.

Figure 16:
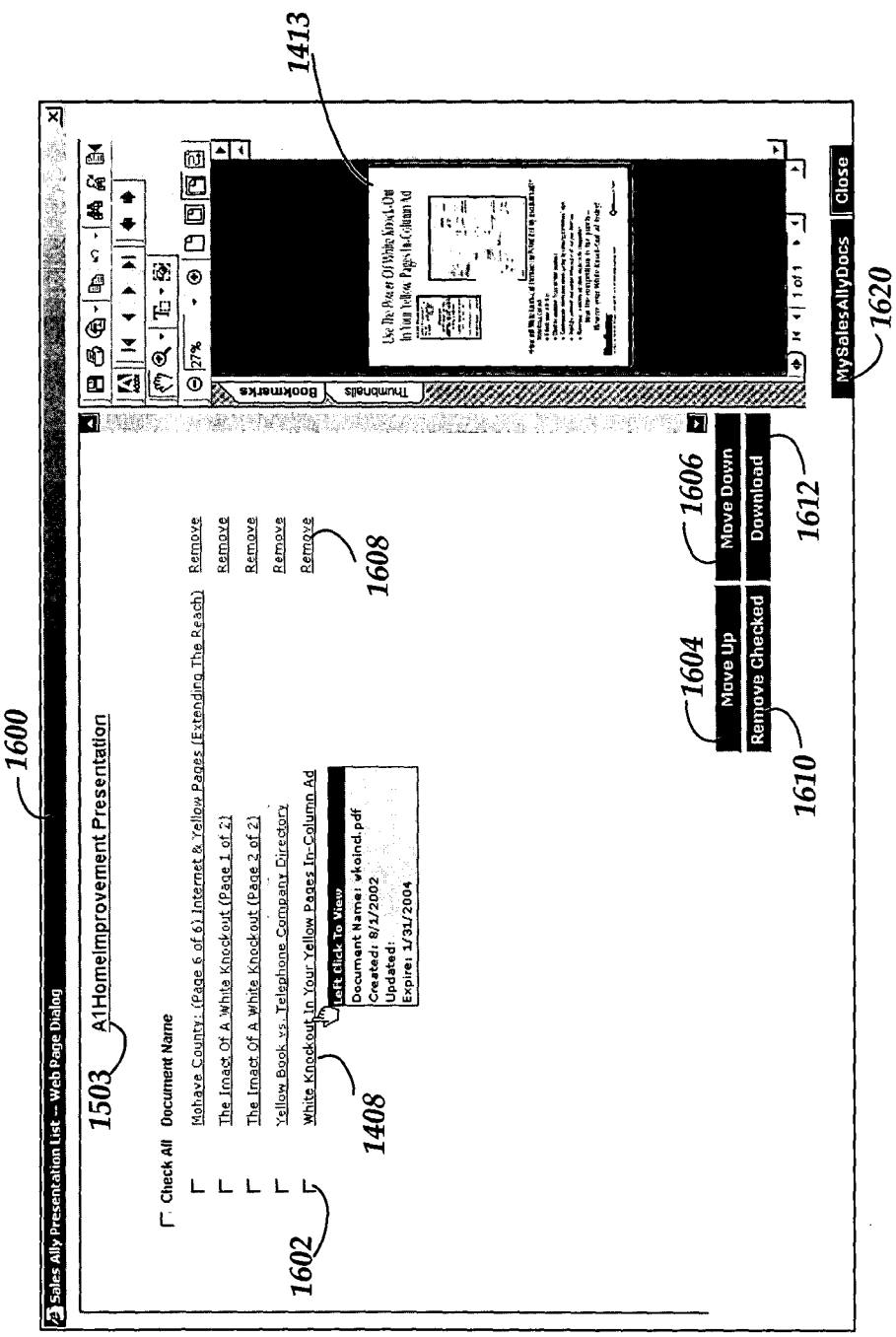
FIG. 16 is a computer screen display of an online user interface displaying document visuals within a selected presentation according to an embodiment of the present invention.

Referring to FIG. 16 an online user interface displaying the document visuals within a selected presentation according to an embodiment of the present invention will be described. The screen display 1600 is rendered in response to the selection of the 'A1HomeImprovement' presentation link in FIG. 15 for viewing content of the presentation 1503. As shown in FIG. 16, the 'A1HomeImprovement' presentation 1503 has added the document visual link 1408 to the documents contained in the presentation 1503. Selecting or clicking on the desired document link will preview the document. The preview documents are displayed on the right side of the screen 1600, as demonstrated by the document visual 1413 being displayed. The document link 1408 may be earmarked by selecting the checkbox 1602 and the 'Remove' link 1608 adjacent to the earmarked document may be selected to permanently remove the document 1408 from the presentation 1503. In the alternative the remove checked button 1610 is selected to remove all earmarked documents from the presentation 1503. The earmarked documents may also be downloaded to the workstations 16a/16b by selecting the download button 1612. Sequencing the documents within a presentation may be revised by checking or earmarking a document and selecting either the move up button 1604 to move the checked document up or the move down button 1606 to move the checked document down. As briefly described above, the 'MySalesAlly' button may be selected to review the file structure of the documents and presentations downloaded to the workstations 16a/16b, This feature may be used to determine needed deletions of downloaded documents or presentations on a user's local computer 16a/16b.

Figure 17:
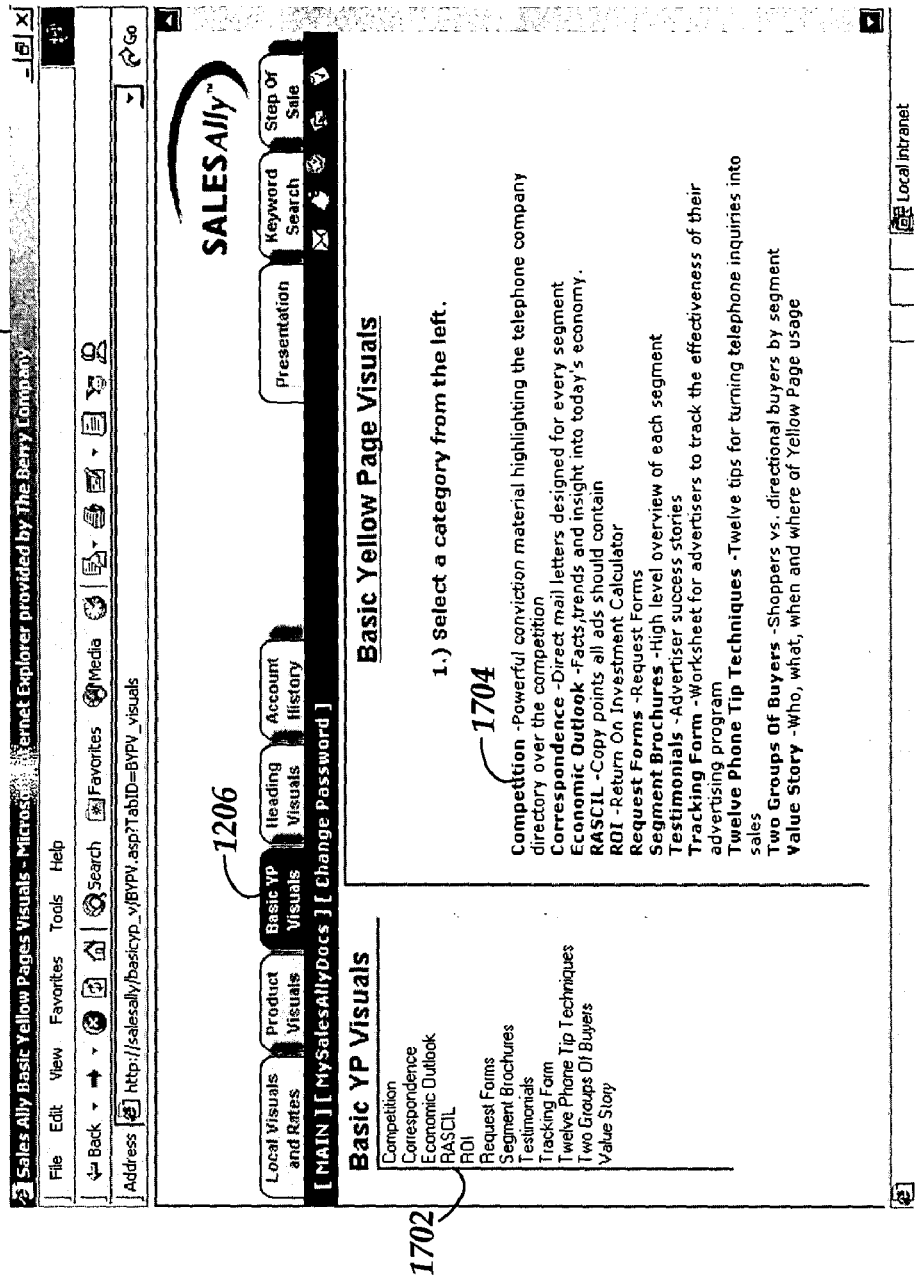
FIG. 17 is a computer screen display showing an online user interface displaying a view of a super-category function utilized in the search and retrieval of data according to an embodiment of the present invention.

FIG. 17 is a computer screen display showing an online user interface displaying a view of a super-category function utilized in the search and retrieval of documents according to an embodiment of the present invention. Screen display 1700 represents the view after selecting the Basic YP (Yellow Pages) Visuals tab 1206. The Basic YP Visuals tab 1206 allows a user to query for document visuals related to the Yellow Pages business directory by selecting from the category display 1702 categories such as competition comparisons, direct mail letters, testimonials of advertiser success stories, return on investment calculators, and others as defined in the Basic YP category definition section 1704. It should be appreciated that categories listed in the display 1702 are the categories having documents associated with them. Once the Basic YP category has been selected and the documents are searched and retrieved, the user may view, print, or download the retrieved documents. The user may also add the retrieved document visuals to existing presentations or use them to create new presentations as described above with respect to FIGS. 13–16.

Figure 18:
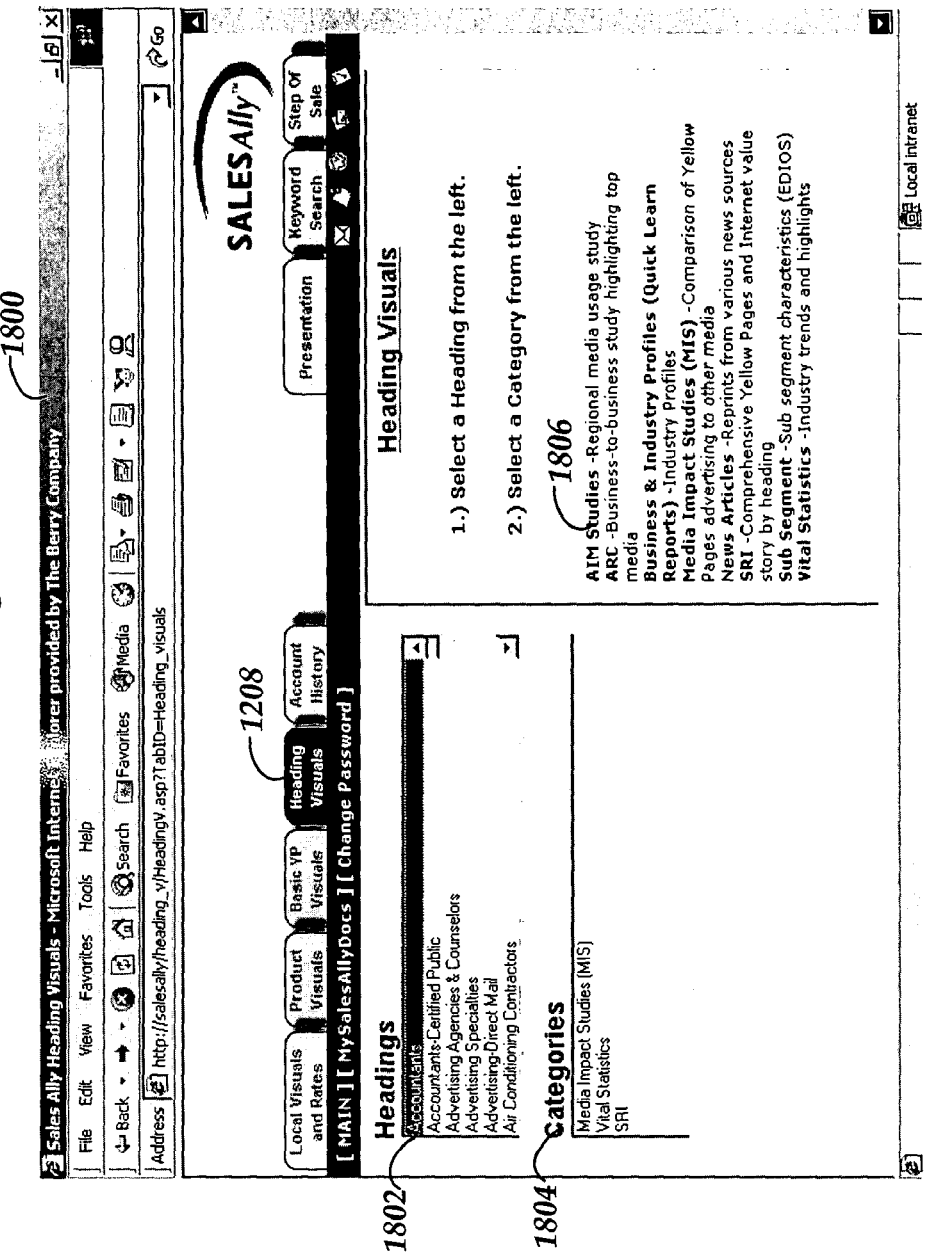
FIG. 18 is a computer screen display showing an online user interface displaying a view of a super-category function utilized in the search and retrieval of data according to an embodiment of the present invention.

FIG. 18 is a computer screen display showing an online user interface displaying a view of a super-category function utilized in the search and retrieval of documents according to an embodiment of the present invention. The screen display 1800 is rendered in response to selecting the heading visual tab 1208. Selecting the heading visual tab 1208 allows a user to query for document visuals associated with headings by selecting headings from the headings display 1802 such as Accountants, Advertising Agencies, Air Conditioning Contractors, and more. The user may further narrow the query by selecting a category from the category menu 1804 based on the selected heading. Example heading categories include advertising comparisons, industry trends and highlights, value stories, and more as defined in the category definition area 1806. Menus 1802 or 1804 may only list headings or categories that have existing documents in the database 12 associated with them. Once the heading and category have been selected the database 12 is searched and the document visuals associated with the metadata that matches the division, super-category and category of the query are retrieved. The user may then choose from delivery options such as viewing, printing, or downloading the retrieved document visuals. The user may also add the retrieved document visuals to existing presentations or use them to create new presentations as described above with respect to FIGS. 13–16.

Figure 19A:
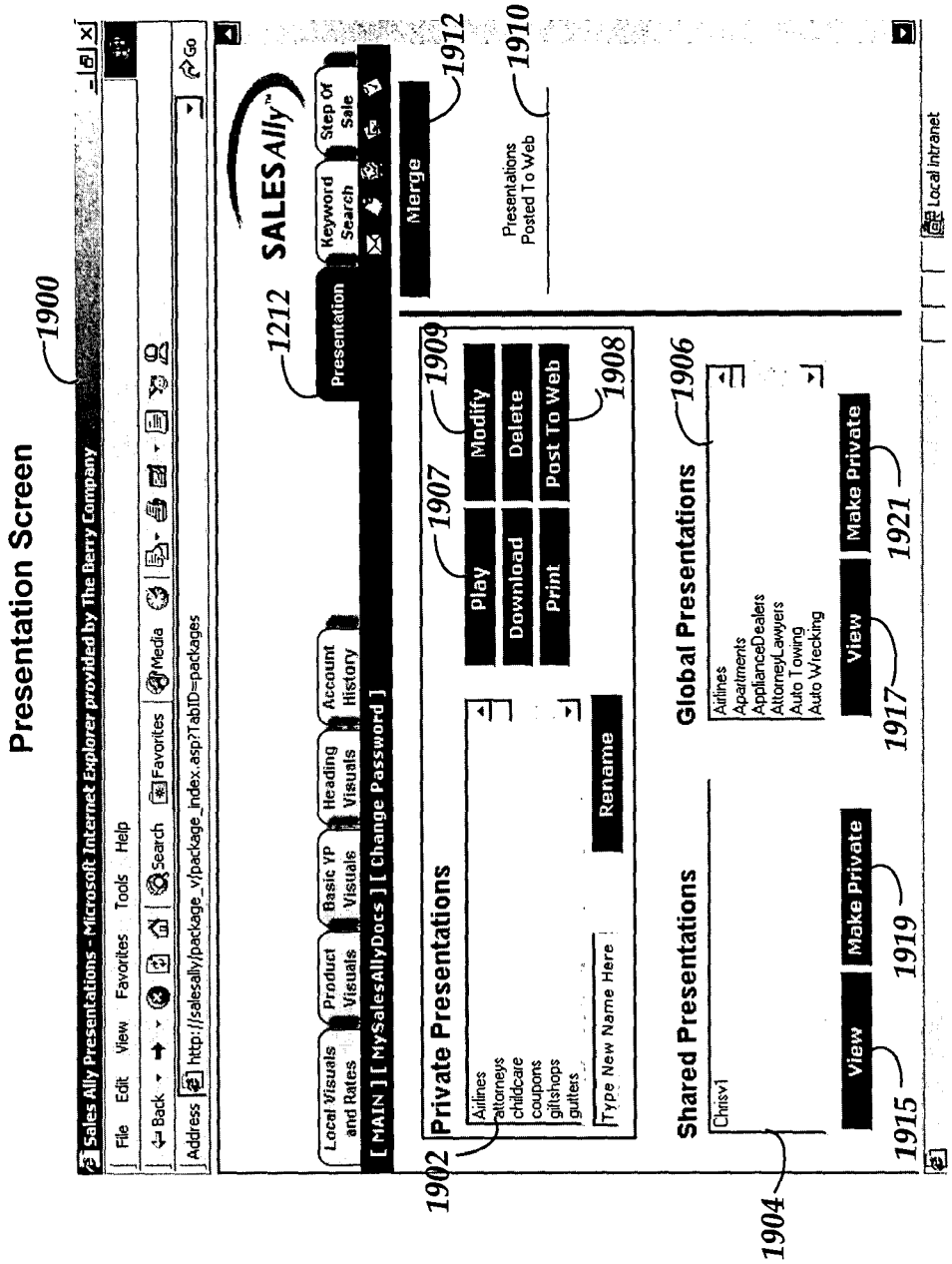
FIGS. 19A–19C are computer screen displays illustrating the operation of an online user interface function for manipulating presentations utilized in the search and retrieval of data according to an embodiment of the present invention.
Figure 19B:
Figure 19C:
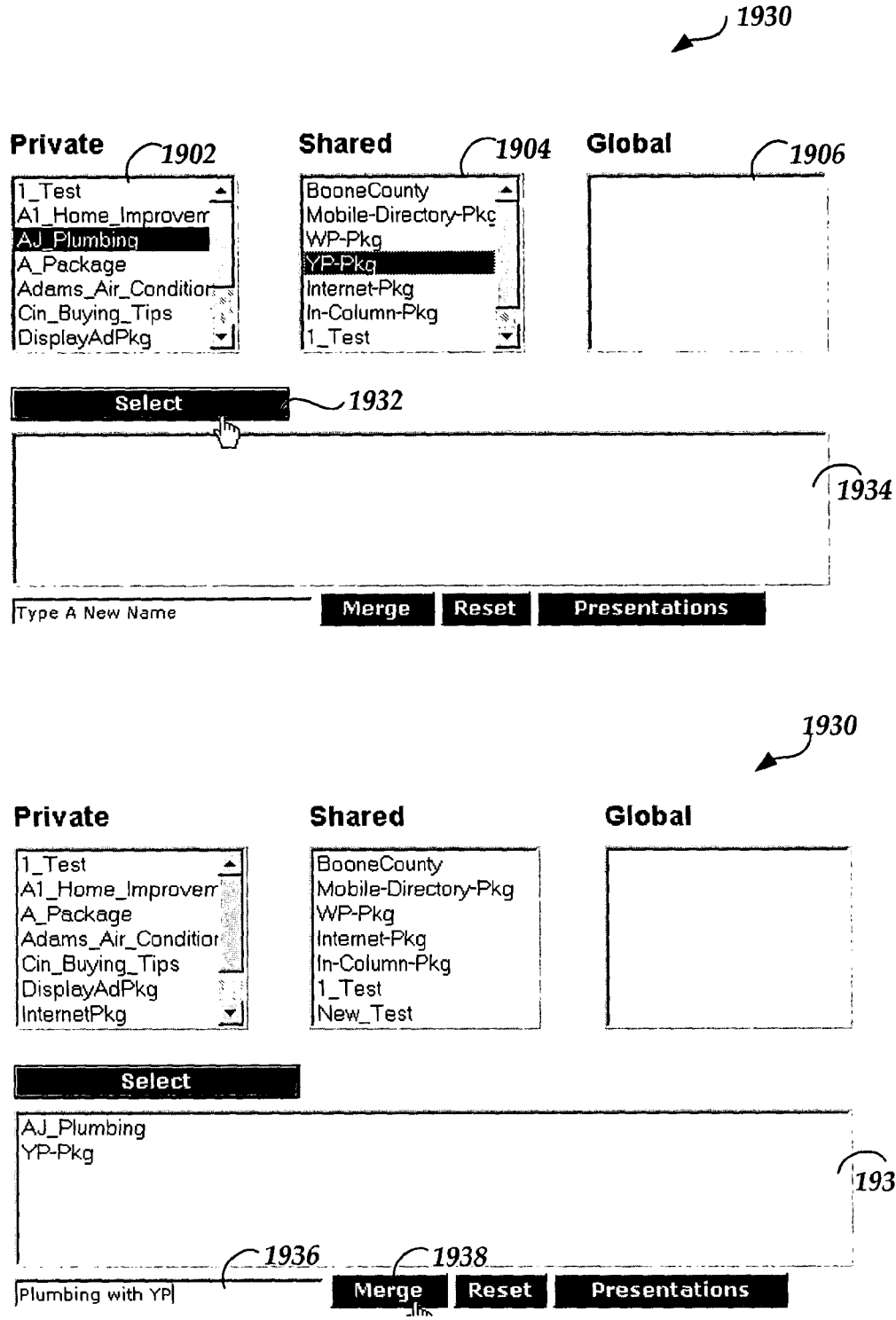

FIGS. 19A–19C are computer screen displays showing an online user interface displaying a view of the online user interface functions for utilizing presentations according to an embodiment of the present invention. Selecting the presentation tab 1212 renders the screen display 1900, searches the database 12 for and retrieves presentations accessible by the current user, and allows a user to view a listing of those presentations. The private presentation section 1902 of the display 1900 shows a listing of private presentations accessible by the current user. The user may highlight private presentations in the private presentation section 1902 and rename, play, download, print, modify, delete, or post to a website the highlighted private presentation. It should be appreciated that users with administrative authorization such as a manager may have additional functions available to make private presentations into shared presentations by highlighting the desired private presentation to make sharable, entering an expiration date, and selecting a share button (not shown).

Private presentations may be renamed on the presentation screen display 1900. This may be accomplished by highlighting the desired private presentation in the section 1902, entering a new presentation name in the text box 1903, and selecting the rename button 1905. Similarly private presentations are played online by highlighting the desired private presentation and selecting the play button 1907. Referring now to FIG. 19B, after the play button 1907 is selected, the display 1911, showing the first document visual 1913 of the selected presentation, is rendered online via the workstation 16a/16b, Subsequent pages of the presentation are viewed by selecting the next button 1915. Returning to FIG. 19A, highlighting a private presentation and selecting the modify button 1909 renders a display listing the content of the selected presentation with functional capabilities for modifications as described above with respect to FIG. 16. Also from display 1900, highlighting a presentation and selecting the post to web button 1908 transmits the highlighted presentation to the external web server 20 where customers or prospects may access and view the presentation by utilizing a pass-code or a link sent to the customer by a user. Once a presentation has been posted to the web the presentation name is listed in the posted to web section 1910 of the display 1900. The private presentations may also be downloaded to local computers or laptops 16a/16b, deleted from the database 12, or printed to a hard copy. It should be appreciated that when a presentation is deleted that the metadata referencing the document visuals as part of the presentation are deleted but the actual document visuals remain in the database 12 until purged.

Global and shared presentations created for users to view, copy, and make private to use as their own are also accessible via the online display 1900. A user may view global and shared presentations by highlighting the presentation in the list box 1904 for shared or the list box 1906 for global and selecting the view button 1915 for shared or the view button 1917 for global. However, prior to modifying the content of the shared or global presentations they must be made private by highlighting the desired shared or global presentation and selecting the make private button 1919 to make the highlighted shared presentation private or 1921 to make the highlighted global presentation private. Once made private, the names of the shared or global presentation appear in the private presentation list box 1902. Now that contents of the global or shared presentation are part of the private presentation list, the presentations may be modified, re-sequenced, renamed, posted to the web, printed, played, or deleted. It should also be appreciated that users with administrative authorization such as a sales manager in a directory advertising business will have an option to delete shared presentations and grant shared status to private presentations.

In addition to creating new presentations as described above with respect to FIGS. 13–16, new presentations may be created by combining existing private, shared, and global presentations using a merge function initiated by selecting the merge button 1912 from the online display 1900. Turning now to FIG. 19C, upon selecting the merge button 1912, the merge screen 1930 is rendered such that the list boxes 1902, 1904, and 1906 are displayed adjacent to each other. As described above the private presentation list box 1902 displays the private presentations to which the current user has access. The shared presentation list box displays all the presentations that have been designated as shared within the division of the current user by administrators such as marketing or sales managers. Lastly the global presentation list box 1906 displays the presentations that have been designated as global by an overall administrator such as marketing. Any number or combination of presentations may be merged into a new presentation by highlighting the desired presentations and selecting the select button 1932. Once the select button 1932 is selected, the highlighted presentations appear in the holding area 1934. After the desired existing presentations that are to be in the new presentation are displayed in the holding area 1934, the new presentation name may be entered in the name text box 1936 and the merge button 1912 may be selected to combine the presentations displayed in the holding area 1934. The newly created merged presentation will now appear in the private presentation list box 1902 of the current user. It should be appreciated that upon merging the presentations, any duplicate visuals existing in the presentations being merged are removed. The newly created presentation may now be modified to tailor it to specific customer needs in the same manner as described above with respect to FIGS. 13–16 and 19A.

Figure 20:
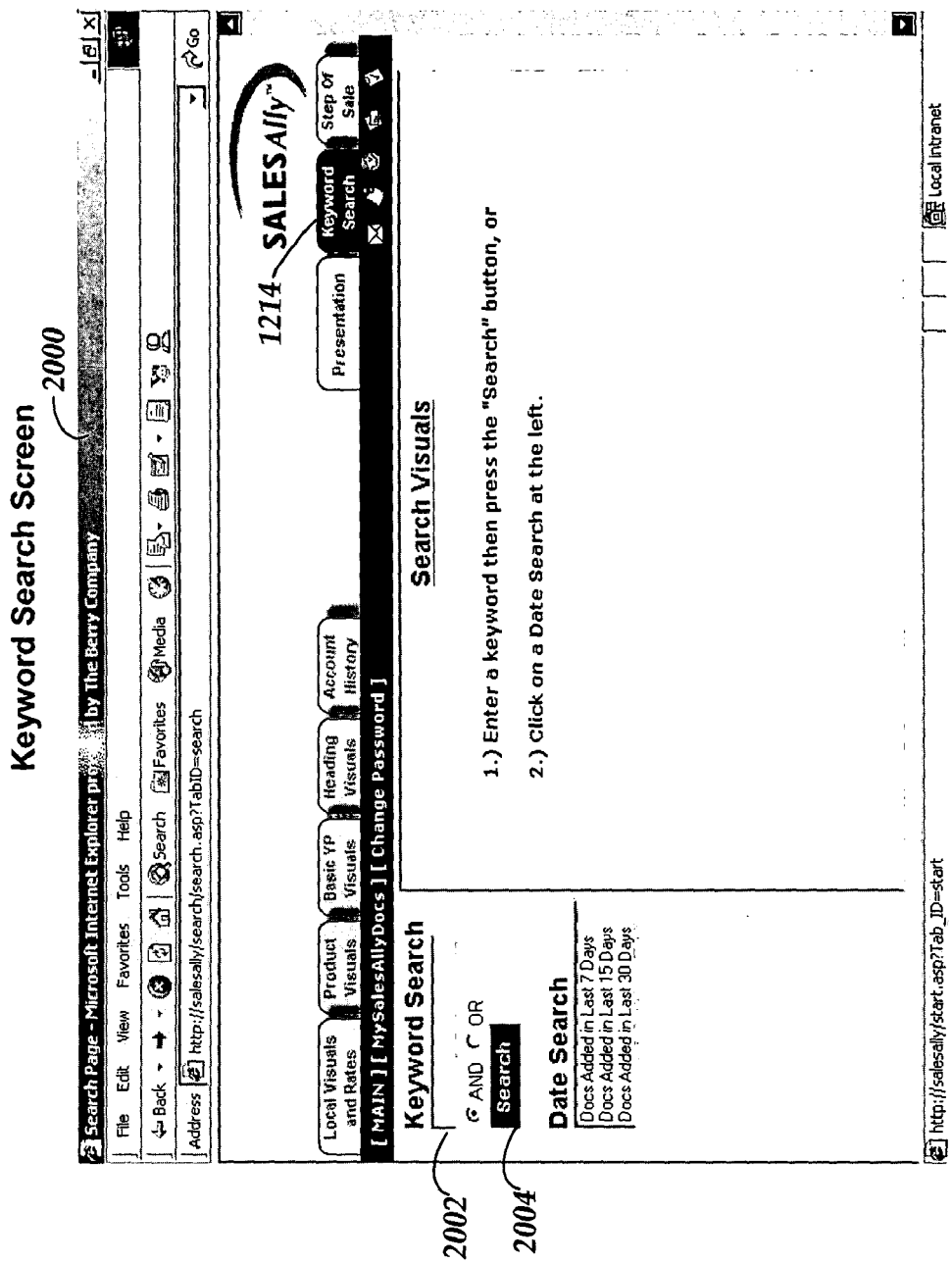
FIG. 20 is a computer screen display showing an online user interface displaying a view of a keyword search function utilized in the search and retrieval of data according to an embodiment of the present invention.

FIG. 20 is a computer screen display showing an online user interface displaying a view of a keyword search function utilized in the search and retrieval of documents according to an embodiment of the present invention. The screen display 2000 is rendered in response to selecting the keyword search tab 1214. Selecting the keyword search tab 1214 allows a user to query for document visuals having the keywords that are entered in the keyword text box 2002 regardless of the category or super-category assigned the document visuals. The user may enter one or more keywords and specify that the search be conducted in the 'AND' format, searching the database 12 for document visuals containing all the keywords in the keyword textbox 2002. In the alternative, the user may specify that the search be conducted in the 'OR' format, thereby searching the database 12 for document visuals containing at least one of the keywords entered in the keyword textbox 2002. The user may conduct an alternative search by selecting a date search option for document visuals added to the database 12 in the last X days where X is a variable number. This is accomplished by selecting a date search option from the date search list box 2004.

Once the keywords or the date search query are entered the search is conducted by selecting the search button 2006. Once the search button 2006 has been selected the database 12 is searched and the document visuals matching the query are retrieved and displayed as a result of the query. The user may then deliver the document visuals by viewing on the user interface, printing or faxing, downloading, or transmitting by electronic mail. The user may also add the retrieved document visuals to existing presentations or use them to create new presentations as described above with respect to FIGS. 13–16.

Figure 21:
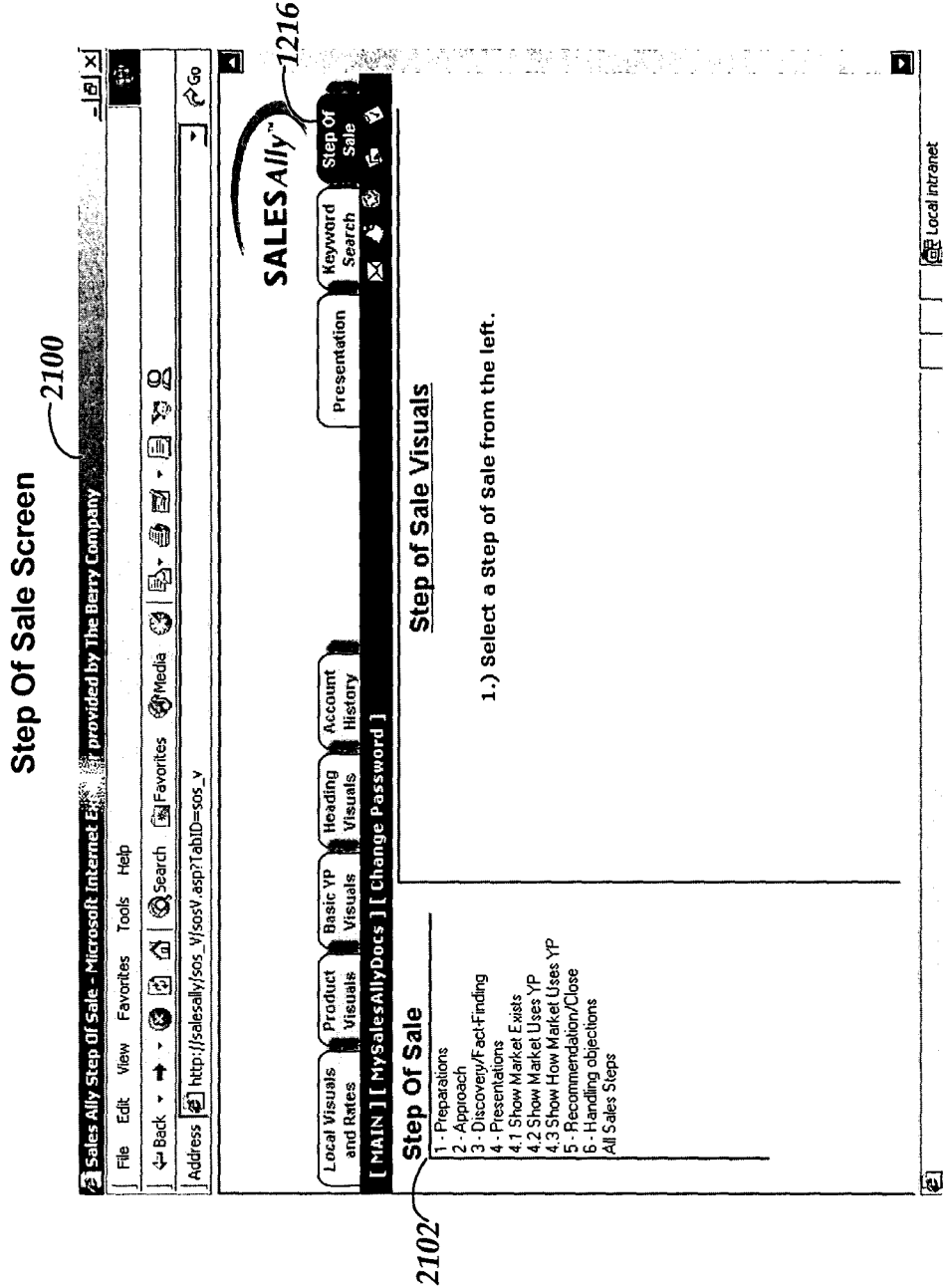
FIG. 21 is a computer screen display showing an online user interface displaying a view of a 'Step Of Sale' search function utilized in the search and retrieval of data according to an embodiment of the present invention.

FIG. 21 is a computer screen display showing an online user interface displaying a view of a business process step or 'Step Of Sale' query function utilized in the search and retrieval of documents according to an embodiment of the present invention. The screen display 2100 is rendered in response to selecting the 'Step of Sale' tab 1214. Selecting the 'Step of Sale' tab 1214 allows a user to query for document visuals associated with a step of sale listed in the 'Step of Sale' list box 2102 regardless of the category or super-category assigned a document visual. Thus, results retrieved in response to a step of sale query may contain document visuals from one or more super-categories and categories. It should be appreciated that the step of sale categories listed in the list box 2102 are the step of sale categories that currently have document visuals available in the repository database 12. A user may select a step of sale category from the list box 2102 representing a query for documents associated with the selected step of sale. Once the step of sale category has been selected a search is conducted to retrieve as the result of the desired query, the document visuals assigned to the division of the current user and associated with the step of sale selected by the user. Once retrieved the result is displayed via the online interface on the workstation 16a/16b, The retrieved document visuals may then be viewed, printed, downloaded, posted to the web, or transmitted by electronic mail or fax as a means of delivery. The user may also add the retrieved document visuals to existing presentations or use them to create new presentations as described above with respect to FIGS. 13–16.

Figure 22:
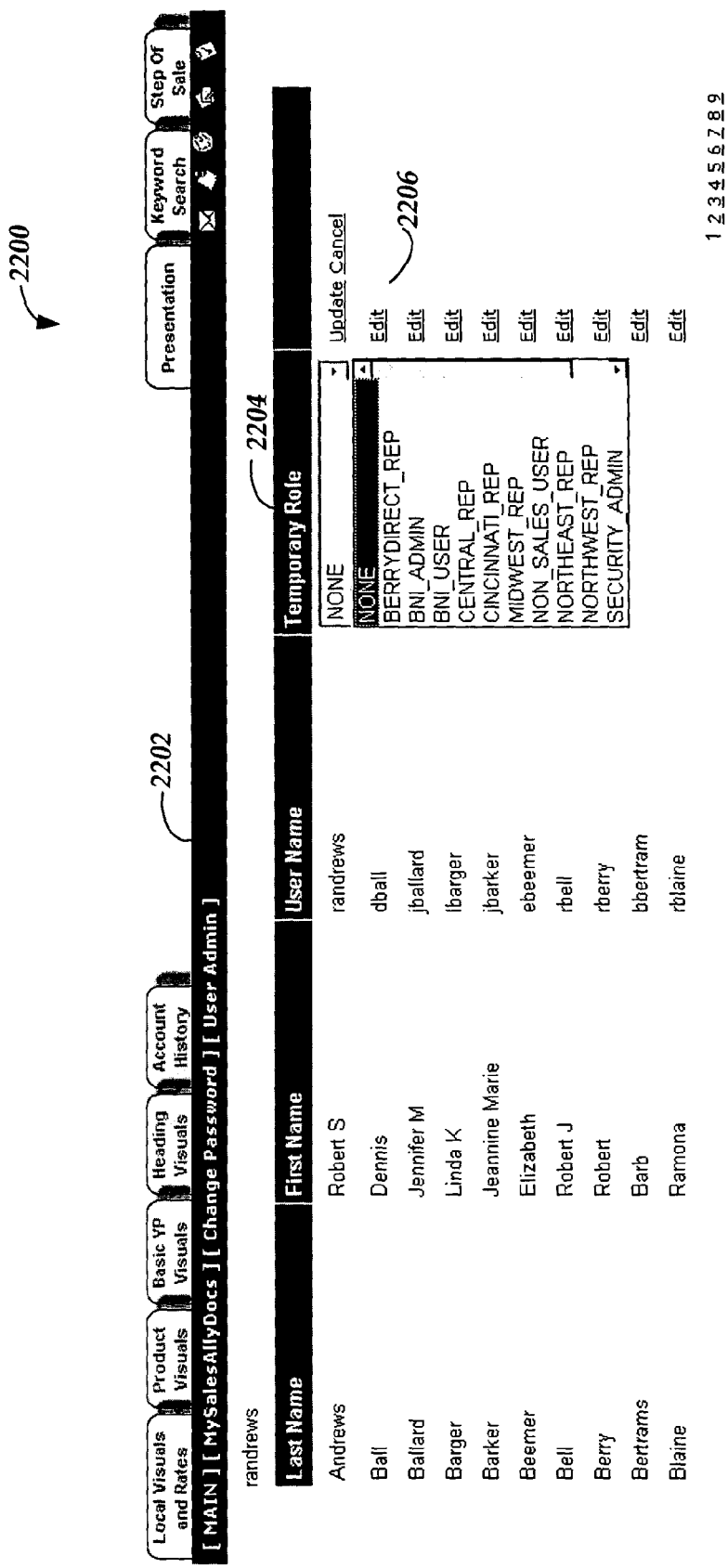
FIG. 22 is a computer screen display showing an online user interface displaying a user listing utilized for editing user access authorizations according to an embodiment of the present invention.

FIG. 22 is a computer screen display showing an online user interface displaying a view of a list of users utilized in making changes to user access authorizations according to an embodiment of the present invention. The screen display 2200 is rendered in response to selecting the 'User Admin' link 2202 from the view of a user with administrative authorization such as a manager. From the display 2200 the manager may perform various edits to the user profiles such as granting or adding a secondary database role to a user, removing a secondary database role, changing a user profile, deactivating a user profile, or reactivating a user profile. These edits are initiated by selecting the edit link 2206 adjacent to the desire user name. Once a secondary or temporary role has been granted it will be listed in the column 2204 of the display 2200. Once granted a secondary role gives a user access to not only the document visuals associated with the home division of the user but also the secondary division.

Figure 23:
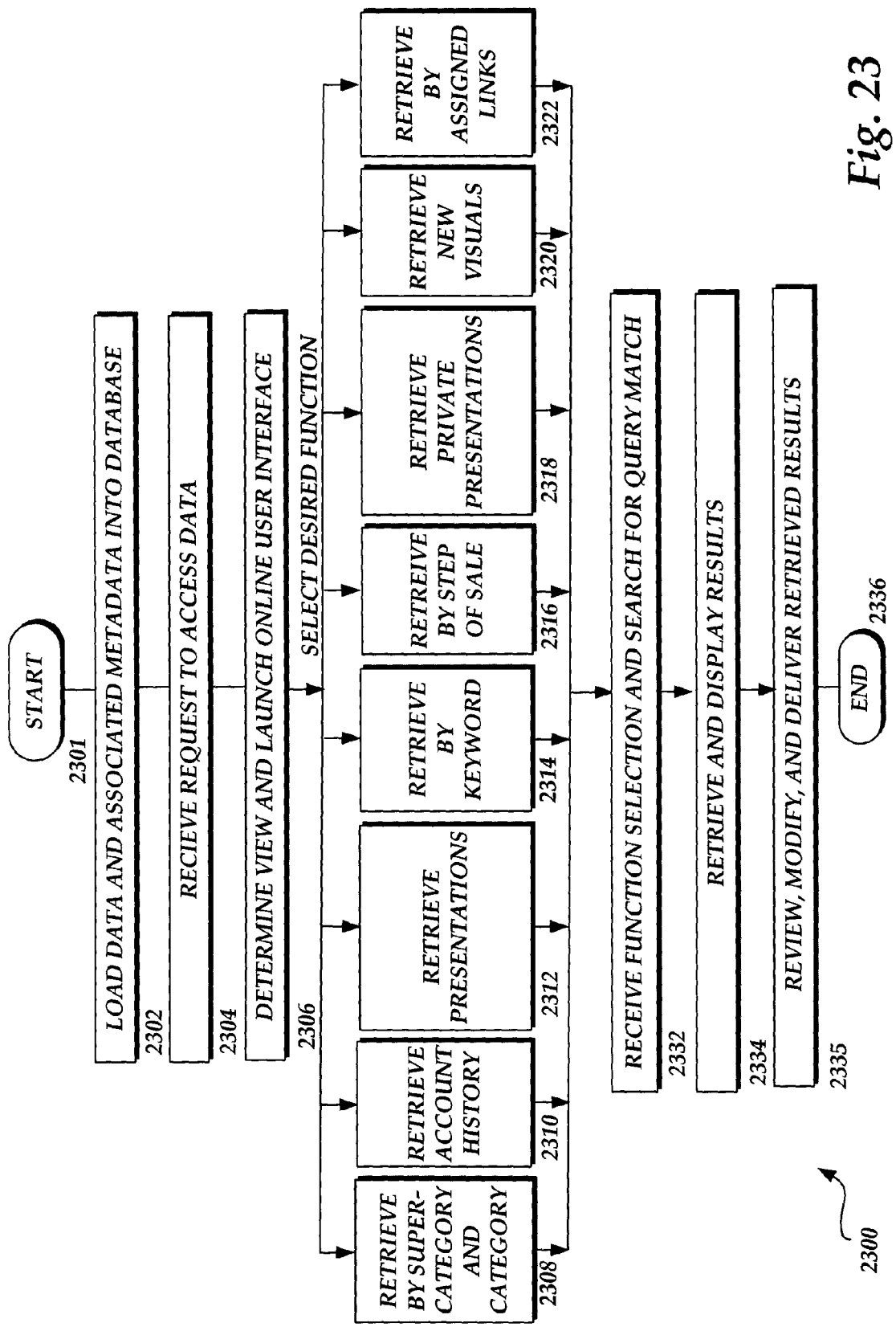
FIG. 23 is a flow diagram illustrating a routine for data aggregation and retrieval according to an embodiment of the present invention.

FIG. 23 is a flow diagram illustrating a routine for data aggregation, retrieval, and delivery according to an embodiment of the present invention. The routine 2300 begins at start operation 2301. The routine 2300 then continues to operation 2302 where data and associated metadata are loaded into the database 12 from the workstation 14a/14b, For example as described above with respect to FIGS. 1–10 document visuals may be opened, assigned attributes, and stored in the database 12.

The routine 2300 then continues to operation 2304 where a request to access the data is received. This may be accomplished by selecting an icon representing the data aggregation, retrieval, and delivery system and logging on to a website with a username and password. In response to receiving the request at operation 2304, the routine 2300 continues to operation 2306 where a view 808 of the database is determined and an online user interface, such as the display 1200, is launched displaying various system functions or operations accessible via the web page display 1200. Upon viewing the online user interface display 1200, a user may select a desired function or operation representing a desired query among the document visuals of the database 12 that have the geographic or business division of the user as an assigned attribute as determined by the view 808.

The user may select the operation 2308 by selecting a super category and a category to represent a desired query. Upon making the selection of a super-category and category, operation 2308 initiates a request that the document visuals matching the desired query be retrieved by searching the super-categories and categories assigned to the document visuals having the geographic or business division of the user as an assigned attribute. As described above with respect to FIGS. 12–18, the Super-categories, each with respective categories, in a directory advertising business utilizing the data aggregation and retrieval system may include Local visuals and rates, Directory Product Visuals, Basic Business Directory Visuals (Yellow Pages), and Heading visuals.

The user may also select operation 2310 by requesting account history retrieval and entering a customer identification number to represent a desired query. Upon making the entry of the customer identification number, such as a phone number, operation 2310 initiates a request that document visuals showing an account history of the customer matching the entered identification number be retrieved from a remote data warehouse 27 by searching the customer identification numbers.

As described above with respect to FIG. 20, the user may also select operation 2312 by selecting the presentation tab 1212 to represent a desired query. Upon selecting the presentation tab 1212, operation 2312 initiates a request that the private presentations accessible by the user and the shared and global presentations be retrieved by searching the presentations having the geographic or business division of the user as an assigned attribute.

As described above with respect to FIG. 20, the user may also select operation 2314 by selecting the keyword search tab 1214, entering one or more keywords, selecting a search format 'AND' or 'OR', and selecting the search button 2006 to represent a desired query. Upon selecting the keyword search tab 1214, the operation 2314 initiates a request that the document visuals matching the desired query, regardless of assigned categories, be retrieved by searching the words of the document visuals having the geographic or business division of the user as an assigned attribute. In the alternative or in conjunction with the keyword search, the user may select a date search by selecting a date search option for document visuals added to the database 12 in the last X days where X is a variable number. This is accomplished by selecting a date search option from the date search list box 2004. Upon selecting the date search option, the operation 2314 initiates a request that the document visuals matching the desired query, regardless of assigned categories, be retrieved by searching the creation dates of the document visuals having the geographic or business division of the user as an assigned attribute.

As described above with respect to FIG. 21, the user may also select operation 2316 by selecting the 'Steps of Sale' tab 1216, and selecting a step of sale from the list box 2102 to represent a desired query. Upon selecting the step of sale, the operation 2316 initiates a request that the document visuals matching the desired query, regardless of assigned categories, be retrieved by searching the steps of sale assigned to the document visuals having the geographic or business division of the user as an assigned attribute.

As described above with respect to FIG. 12, the user may also select the operation 2318 by selecting a private presentation from the 'My Packages' list box 1218 to represent a desired query. Upon making the selection, operation 2318 initiates a request that the document visuals contained in the selected private presentation be retrieved by searching the document visuals assigned to the selected private presentation and having the geographic or business division of the user as an assigned attribute.

Also as described above with respect to FIG. 12, the user may select the operation 2320 by selecting from the new visual list box 1220, a super-category view button having one or more new visuals added since the last login to represent a desired query. Upon making the selection, operation 2320 initiates a request that the document visuals matching the desired query be retrieved by searching the document visuals added since the last login that have the selected super-category and geographic or business division of the user as assigned attributes.

Lastly, as described above with respect to FIG. 12, the user may also select the operation 2322 by selecting a related link from the list box 1222 to represent a desired query. Upon making the selection, operation 2322 initiates a request that the web page matching the desired query be retrieved from among the links associated with the geographic or business division of the user.

After the selection of any of the operations 2308–2322, the routine 2300 continues to operation 2332 where the function selection is received and the database or remote systems are searched for query matches. Operation 2332 searches the data and associated metadata for table relationships that match the desired query. Next the routine 2300 continues to operation 2334 where the resulting document visuals or presentations matching the query are retrieved and displayed via the online user interface on the workstation 16a/16b. The routine 2300 then continues to operation 2335 where additional system functions for modification of the documents or presentations such as renaming, deletion, association, concatenation, merging and sequencing are made available. Operation 2335 may also deliver the resulting documents or presentations to the user or customer via various mediums such as screen display viewing, printing, downloading to local computers, electronic mail transmission, posting to websites, faxing, and playing presentations over a screen display. The routine 2300 then terminates at end operation 2336.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for aggregating and retrieving a variety of data and associated metadata within a computer database and making the data accessible via an online user interface over a distributed network wherein the data comprises one or more document visuals, the method comprising:

loading the data and the associated metadata into the computer database via a content manager wherein the computer database comprises a repository and the content manager comprises an administrative user interface for loading the document visuals each document visual having one or more attributes into the repository and wherein loading the data and associated metadata comprises:

creating and storing the one or more document visuals and the one or more attributes in the repository;

adding one or more users to the repository and assigning a primary geographic or a primary business division to a user profile of each user; and creating and storing one or more visual presentations by associating one or more of the document visuals with a visual presentation;

receiving from a user a request to access the data;

in response to receiving the request, launching the online user interface displaying at least one view of the computer database wherein the content manager is operative to assign a primary repository role to each user based on the primary geographic or business division assigned to the user wherein the primary repository role of the user determines the at least one view of the database and wherein a secondary repository role may be assigned to each user such that the online user interface further displays a second view that includes the document visuals and the visual presentations having the geographic or business division associated with the secondary repository role assigned as an attribute;

receiving a selection of one or more functions of the online user interface, the selection representing a desired query;

in response to receiving the desired query, searching the data arid the associated metadata to retrieve one or more results that match the desired query wherein the associated metadata comprises the attributes of each document visual and each geographic or business division has an established view of the database, each established view providing access to just document visuals and visual presentations having as an attribute the primary and graphic or business division assigned to the user and wherein searching the data and associated metadata comprises searching just the document visuals, the visual presentations, and the attributes provided by the established view;

displaying the results that match the desired query via the online user interface;

associating one or more of the results to add to an existing association of data or to create a new association of data; and displaying the existing or new association of data via the online user interface wherein each association of data comprises a visual presentation;

wherein the repository comprises one or more attribute tables and one or more relational tables defining linking relationships between the attributes of the document visuals and the document visuals such that multiple attributes may be assigned to each document visual and wherein one copy of each document visual is loaded into the repository and the one copy of a document visual is retrieved in response to the document visual matching the desired query.

2. The method of claim 1, wherein loading the data and associated metadata further comprises at least one of the following:

creating and storing one or more templates, wherein the templates may be used to automatically populate one or more attributes of the document visuals; and modifying one or more of the document visuals, one or more of the attributes, one or more of the user profiles, or one or more of the attribute tables.

3. The method of claim 1, wherein each user profile comprises a username, a password, and the primary geographic or business division assigned to the user and wherein the request to access the data comprises submitting a username and a password to access the data.

4. The method of claim 1, wherein the secondary repository role is assigned an expiration date and wherein after the secondary repository role has expired or is revoked, the at least one view further includes one or more private presentations created and stored prior to the expiration date or the secondary repository role being revoked the private presentations having the geographic or business division associated with the secondary repository role assigned as an attribute.

5. The method of claim 2, wherein the visual presentations comprise at least one of the following:

one or more private presentations accessible by a single user;

one or more shared presentations accessible by all users within one or more geographic or business divisions; and one or more global presentations accessible by in all users.

6. The method of claim 5, wherein the attributes comprise at least one of the following:

a description of each document visual;

one or more key words for each document visual;

an expiration date, for each document visual;

a source information date for each document visual;

a creation date of each document visual;

an update date for updated document visuals;

at least one super-category and category assigned to each document visual wherein each category is associated with a super-category;

at least one business process step assigned to each document visual; and at least one geographic or business division assigned to each document visual.

7. The method of claim 6, further comprising:

generating one or more repository reports monitoring the contents of the repository wherein the reports comprise at least one of the following:

a new document visual report including a listing of new documents added to the repository in the last X days wherein X is a variable number;

an updated document visual report including a listing of documents that have been updated in the repository;

an expired document report including a listing of documents in the repository that have expired;

a keyword report including a listing of documents in the repository and the keywords associated with each document;

a presentation report including a listing the presentations defined in the repository, a creation date of each presentation, an update date of one or more presentations, a presentation type indicator for each presentation, an expiry date of one or more presentations;

an advertising rate update report including an automatically updated listing of the cost of advertising in one or more directories or on an Internet website;

a usage report including a listing of usage tracking showing repository login activity by users of the repository; and a user report including a listing of one or more user profiles of the users of the repository.

8. The method of claim 6, wherein the document visuals comprise one or more collateral documents for supporting the sale of ads in advertising directories and the attributes further comprise one or more headings associated with one or more document visuals and the super-categories comprise local directory visuals or rates, product visuals, business directory visuals, and heading visuals.

9. The method of claim 8, wherein the collateral documents comprise at least one of the following:

one or more local directory visuals wherein the attributes further comprise at least one directory associated with the local directory visuals; and one or more directory rate sheets wherein the attributes further comprise at least one directory associated with the directory rate sheet wherein the directory rates are automatically updated from a remote system.

10. The method of claim 6, wherein creating and storing one or more document visuals having one or more attributes comprises:

selecting and opening one or more document visual files containing the document visuals to be added to the repository wherein the open files are displayed on the administrative user interface;

assigning one or more attributes to the open document visuals; and saving the open document visuals and the attributes to the repository.

11. The method of claim 10, wherein assigning one or more attributes comprises utilizing a template to automatically populate one or more attribute fields in the administrative user interface wherein the template may be repeatedly used for document visuals having common attributes.

12. The method of claim 1, wherein the users are added by a repository administrator or automatically added and assigned a primary geographic or business division from a remote payroll system whenever a user is added to the remote payroll system.

13. The method of claim 1, wherein creating and storing one or more presentations comprises:

selecting a category from which to associate the document visuals wherein the category is an attribute of one or more document visuals and wherein each category is associated with a super-category;

retrieving and displaying a list of documents visuals having the selected category as an attribute;

selecting and determining the order of one or more document visuals from the list to associate in a presentation;

selecting a presentation type that determines access to the presentation wherein the presentation type comprises a global, a shared, or a private presentation;

in response to a global presentation type being selected, assigning access to the presentation to all geographic or business divisions;

in response to a shared presentation type being selected, assigning access to the presentation to one or more geographic or business divisions;

in response to a private presentation type being selected, assigning access to a user wherein each user is assigned a primary geographic or business division based on the user profile of the user; and naming and saving the presentation to the repository.

14. The method of claim 6, wherein modifying the attribute tables comprises at least one of the following;

updating a category or super-category table wherein every category is associated with at least one super-category wherein the super-categories broadly classify each document visual and the categories organize the document visuals and define a pat where a document visual is physically stored in the repository;

updating a link table representing links to web sites related to specific geographic or business divisions or all geographic or business divisions and displayed on the on-line user interface of the geographic or business division assigned;

updating a directory table having a directory name, a directory number, an Internet directory number, a corresponding state code, and a corresponding geographic or business division identification wherein the directories are referenced in response to a query of local visuals and rates;

updating a division table representing all the geographic or business divisions available as an attribute in the repository and containing a default repository role and a default database view for each division wherein the views provide access to just the document visuals of an assigned division and wherein a view for a manager provides access to the document visuals from all divisions and to all private presentations from a primary geographic or business division assigned to the manager;

updating a heading table representing all the headings associated with document visuals and headings formerly associated with document visuals and retained as inactive for archival purposes;

updating a business process steps table identifying the steps of a business process that may be assigned to a document visual and a stabs wherein when assigned to a document visual associates the document visuals with all business process steps; and updating a state table identifying the states where the directories are published.

15. The method of claim 6, wherein modifying a user profile comprises changing a repository role for a user or assigning a secondary role to a user wherein the secondary role has an expiration date.

16. The method of claim 6, wherein modifying a document visual comprises expunging a document visual from the repository or updating the document visual and replacing a previous version of the document visual in a same storage location without updating attributes or saving the document visual to the repository.

17. The method of claim 6, wherein the super-categories comprise:

a first main category representing one of local document visuals and local rates of an advertising directory covering a market region;

a second main category representing document visuals of advertising products from categories having one or more document visuals associated with them;

a third main category representing document visuals related to a business directory; and a fourth main category representing document visuals associated with one or more advertising headings.

18. The method of claim 1, wherein functions of the online user interface comprise at least one of the following:
retrieving one or more of the document visuals based on a query including a super-category and category;
retrieving an account history of one or more customers based on a query including a customer telephone number;
retrieving one or more of the visual presentations based a query including one or more presentations;
retrieving one or more of the document visuals based on a query including one or more key words;
retrieving one or more of the document visuals based on a query including a request for documents added in the last X days, wherein X represents a variable number of days, retrieving one or more of the documents visuals from among all categories and super-categories based on a query including a business process step;
retrieving one or more private presentations based on a query including one or more private presentations;
retrieving one or more new document visuals added since a last request for access to the data based on a query including a super-category; and
accessing one or more links from the online user interface where the links are associated in a link table in the repository wit the geographic or business division assigned to the user;
accessing electronic mail and message features via an icon displayed on the online user interface; and
accessing a folder structure of downloaded document visuals, search results and presentations via a link displayed on the online user interface.

19. The method of claim 18, wherein the results that match the desired query comprise one or more retrieved document visuals, further comprising at least one of the following:
viewing the retrieved document visuals via the online user interface;
printing the retrieved document visuals;
downloading the retrieved document visuals to a remote computer;
transmitting the retrieved document visuals via electronic mail or facsimile; and
associating one or more of the retrieved document visuals into one or more visual presentations wherein the visual presentations comprise one or more private presentations accessible by the user.

20. The method of claim 19, wherein the results that match the desired query comprise one or more retrieved visual presentations, further comprising at least one of the following:
viewing the retrieved visual presentation via the online user interface;
concatenating the document visuals associated with the retrieved the presentations and printing the retrieved visual presentations;
downloading the retrieved visual presentations to a remote computer;
transmitting the retrieved visual presentations via electronic mail or facsimile; and
merging one or more of the retrieved visual presentations into one or more private presentations accessible by the user.

21. The method of claim 19, wherein the visual presentations further comprise one or mote shared and one or more global presentations, further comprising at least one of the following:
at least one of viewing and making into a private presentation at least one of the shared presentations and the global presentations;
at least one of creating, renaming, playing, modifying, downloading, printing, deleting, and posting to a website one or more private presentations; and
creating a new private presentation by merging two or more of the visual presentations.

22. The method of claim 20, wherein the user comprises a manager with administrative access and wherein the online user interface function selections are searched among all the document visuals with any geographic or business division as an assigned attribute and among all visual presentations with the primary geographic or business division assigned to the manager as an assigned attribute, further comprising making a private presentation into a shared presentation accessible by all users associated with one or more geographic or business divisions.

23. A computer readable medium containing computer executable instructions which when executed by a computer perform a method for aggregating and retrieving a variety of documents within a repository and making the documents accessible via an online user interface over a distributed network, the method comprising:
receiving from a user a request to access the documents;
in response to receiving the request, rendering the online user interface displaying a view of the repository;
receiving a selection of a repository query;
in response to receiving the selection, searching the documents and one or more associated attributes and retrieving one or more documents tat match the repository query wherein the one copy of the one or more documents is retrieved in response to the documents matching the repository query; and
displaying the documents that match the repository query via the online user interface;
wherein the repository queries are operative to:
retrieve the documents by searching for one or more categories;
retrieve an account history of one or more customers by searching for a customer telephone number;
retrieve the documents by searching for one or more key words;
retrieve the documents by searching for documents added in the last X days, wherein X represents a variable number of days; or
retrieve the documents added since a last request for access by searching for a super-category; or
retrieve one or more presentations by searching for presentations associated with the view wherein the presentations comprise one or more private presentations accessible by a current user, one or more shared presentations shared among one or more entire divisions, or one or more global presentations shared among all divisions, wherein the method includes:
viewing or making into a private presentation one or more of the shared or global presentations;
creating a private presentation by merging two or more of the presentations; and
creating, renaming, playing, modifying, downloading, printing, deleting, or posting to a website one or more private presentations.

24. The computer readable medium of claim 23, further comprising prior to receiving the request to access the documents, publishing the documents and the associated attributes to the repository via an administrative interface wherein one copy of each document is published to the repository and wherein publishing the documents and the associated attributes to the repository via the administrative interface comprises:
   creating and storing the one or more documents in the repository with each document having one or more attributes;
   adding one or more users to the repository and assigning a primary division to a user profile of each user wherein the primary division represents a geographic or business area;
   creating and storing one or more visual presentations by associating the documents wherein the visual presentations are private, shared, or global;
   creating and storing one or more templates, wherein the templates may be used to automatically populate one or more attributes of the documents; or
   modifying one or more of the documents, one or more the attributes, one or more user profiles, or one or more attribute tables.

25. The computer readable medium of claim 24, further comprising assigning a primary role to each user based on the primary division assigned to the user wherein the primary role of the user determines the view of the repository queries displayed to the user via the online user interface wherein a view of the repository queries is established for each division wherein the view provides access to just the documents associated with the division for which the view is established and wherein searching the documents and associated attributes comprises searching just the documents provided by the view.

26. The computer readable medium of claim 24, wherein the associated attributes comprise a description of each document, one or more key words for each document, an expiration date for each document, a source information date for cach document, at least one super-category and category assigned to each document wherein each category is associated with a super-category, at least one business process step assigned to each document, and at least one division assigned to each document.

27. The computer readable medium of claim 23, further comprising:
   printing the documents matching the repository query;
   downloading the documents matching the repository query;
   transmitting the documents matching the repository query via electronic mail or facsimile; or
   associating one or more of the documents matching the repository query into one or more private presentations accessible by the user.

28. A system for aggregating and retrieving a variety of data and associated metadata and making the data accessible over a distributed network, the system comprising:
   a memory;
   a repository containing:
      one or more document visuals, wherein each document visual has associated metadata comprising one or more attributes of each document visual wherein the attributes include at least one of the following:
         a description of each document visual;
         one or more key words for each document visual;
         an expiration date for each document visual;
         a source information date for each document visual;
         a creation date of each document visual;
         an update date for updated document visuals;
         at least one super-category and category assigned to each document visual wherein each category is associated with a super-category and wherein the super-categories include at least one of the following:
            a first main category representing one of local document visuals and local rates of an advertising directory covering a market region;
            a second main category representing document visuals of advertising products from categories having one or more document visuals associated with them;
            a third main category representing document visuals related to a business directory; and
            a fourth main category representing document visuals associated with one or more advertising headings:
         at least one business process step assigned to each document visual; and
         at least one of a geographic and a business division assigned to each document visual;
      one or more attribute tables and one or more relational tables defining linking relationships between the attributes of the document visuals and the document visuals such that multiple attributes may be assigned to each document visual and wherein one copy of cach document visual is loaded into the repository and the one copy of a document visual is retrieved in response to the document visual matching a desired query;
      one or more users of the repository wherein each user has a primary geographic or a primary business division assigned to a user profile of each user;
   a display unit;
   a processor executing computer executable instructions for providing an online user interface operative to:
      receive from a user a request to access the document visuals;
      in response to receiving the request, display at least one view of the repository;
      receive a selection of one or more functions of the online user interface, the selection representing a desired query wherein the functions are operative to:
         retrieve one or more document visuals based on a query including a super-category and category:
         retrieve an account history of one or more customers based on a query including a customer telephone number;
         retrieve one or more visual presentations based a query including one or more presentations;
         retrieve the document visuals based on a query including one or more key words;
         retrieve one or more document visuals based on a query including a request for documents added in the last X days, wherein X represents a variable number of days;
         retrieve the documents visuals from among all categories and super-categories based on a query including a business process step;
         retrieve one or more visual presentations based on a query including one or more visual presentation;
         retrieve one or more new document visuals added since a last request for access to the data based on a query including a super-category; and access one or more links from the online user interface where the links are associated in a link table in the repository with the geographic or business division assigned to the user;

in response to receiving the desired query, search the document visuals and the associated attributes to retrieve one or more results that match the desired query;

display the results that match the desired query via the online user interface;

associate one or more of the results to add to an existing association of document visuals or to create a new association of document visuals; and display the existing or new association of document visuals via the online user interface wherein the new or existing association of document visuals comprise a visual presentation; and a processor executing computer executable instructions operative to:

create and store one or more templates, wherein the templates may be used to automatically populate one or more of the attributes of the document visuals;

modify one or more of the document visuals, one or more of the attributes, one or more of the user profiles, and one or more of the attribute tables, and assign a primary repository role to each user based on the primary geographic or business division assigned to the user wherein the primary repository role of the user determines the at least one view of the repository displayed to the user via the online user interface upon receiving the request to access the document visuals, wherein a view of the repository established for each geographic or business division wherein each view provides access to just document visuals and visual presentations having as an attribute the primary geographic or business division assigned to the user and wherein searching the document visuals and associated attributes comprises searching just the document visuals, the visual presentations, and the attributes provided by the view.

* * * * *